United States Patent
Kowalski et al.

(10) Patent No.: US 11,003,483 B1
(45) Date of Patent: May 11, 2021

(54) PARAMETERIZED LAUNCH ACCELERATION FOR COMPUTE INSTANCES

(71) Applicant: Amazon Technologies, Inc., Seattle, WA (US)

(72) Inventors: Marcin Kowalski, Cape Town (ZA); Karel Scott, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 16/457,415

(22) Filed: Jun. 28, 2019

(51) Int. Cl.
| | |
|---|---|
| *G06F 9/455* | (2018.01) |
| *G06F 9/50* | (2006.01) |
| *G06F 9/445* | (2018.01) |
| *G06F 9/38* | (2018.01) |
| *G06F 9/54* | (2006.01) |

(52) U.S. Cl.
CPC ........ *G06F 9/45558* (2013.01); *G06F 9/3871* (2013.01); *G06F 9/445* (2013.01); *G06F 9/5016* (2013.01); *G06F 9/544* (2013.01); *G06F 2009/45583* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 6,920,533 B2 | 7/2005 | Coulson et al. | |
| 7,107,444 B2 | 9/2006 | Fortin et al. | |
| 7,409,537 B2 | 8/2008 | Tsang | |
| 7,590,839 B2 | 9/2009 | van der Veen et al. | |
| 7,669,044 B2 | 2/2010 | Fitzgerald et al. | |
| 8,225,079 B2 | 7/2012 | Smith et al. | |
| 8,732,698 B2 | 5/2014 | Ling et al. | |
| 2014/0115228 A1* | 4/2014 | Zhou | G06F 9/45533 711/102 |
| 2018/0150413 A1* | 5/2018 | Parker | G06F 9/5016 |

OTHER PUBLICATIONS

AWS, "Amazon Elastic Compute Cloud—User Guide for Linux Instances", Updated May 13, 2019, pp. 1-1059.
"Sysprep (System Preparation) Overview", Retrieved from https://docs.microsoft.com/en-us/previous-versions/windows/it-pro/windows-8.1-and-8/hh825209(v=win.10), May 3, 2019, pp. 1-5.
"Sysprep Process Overview", Retrieved from https://docs.microsoft.com/en-us/previous-versions/windows/it-pro/windows-8.1-and-8/hh825084(v%3dwin.10), May 3, 2019, pp. 1-7.

* cited by examiner

*Primary Examiner* — Charlie Sun
(74) *Attorney, Agent, or Firm* — Robert C. Kowert; Kowert, Hood, Munyon, Rankin & Goetzel, P.C.

(57) ABSTRACT

A request to initiate a launch procedure of a compute instance at a virtualization host configured to access a remote storage device over a network is received. A memory buffer of the host is allocated as a write-back cache for use during a portion of the launch procedure. In response to a write request directed to remote storage during the portion of the launch procedure, the write payload is stored in the buffer and an indication of fulfillment of the write is provided independently of obtaining an acknowledgement that the payload has been propagated to the remote storage. Subsequent to the portion of the launch procedure, payloads of other write requests are transmitted to the remote storage device.

21 Claims, 11 Drawing Sheets

PARAMETERIZED LAUNCH ACCELERATION FOR COMPUTE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that include network-accessible services that can be used by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users at a computing service by providing each user with one or more compute instances (e.g., guest virtual machines) hosted by the single physical computing machine. Each such compute instance may be regarded as a software simulation acting as a distinct logical computing system. Clients of the computing service may in some cases specify the machine images to be used for their compute instances. The interval between the submission of a request to launch or start up a compute instance, and the time at which the requested compute instance becomes available for the requesting client's applications, may vary based on a number of factors.

Figure 1:
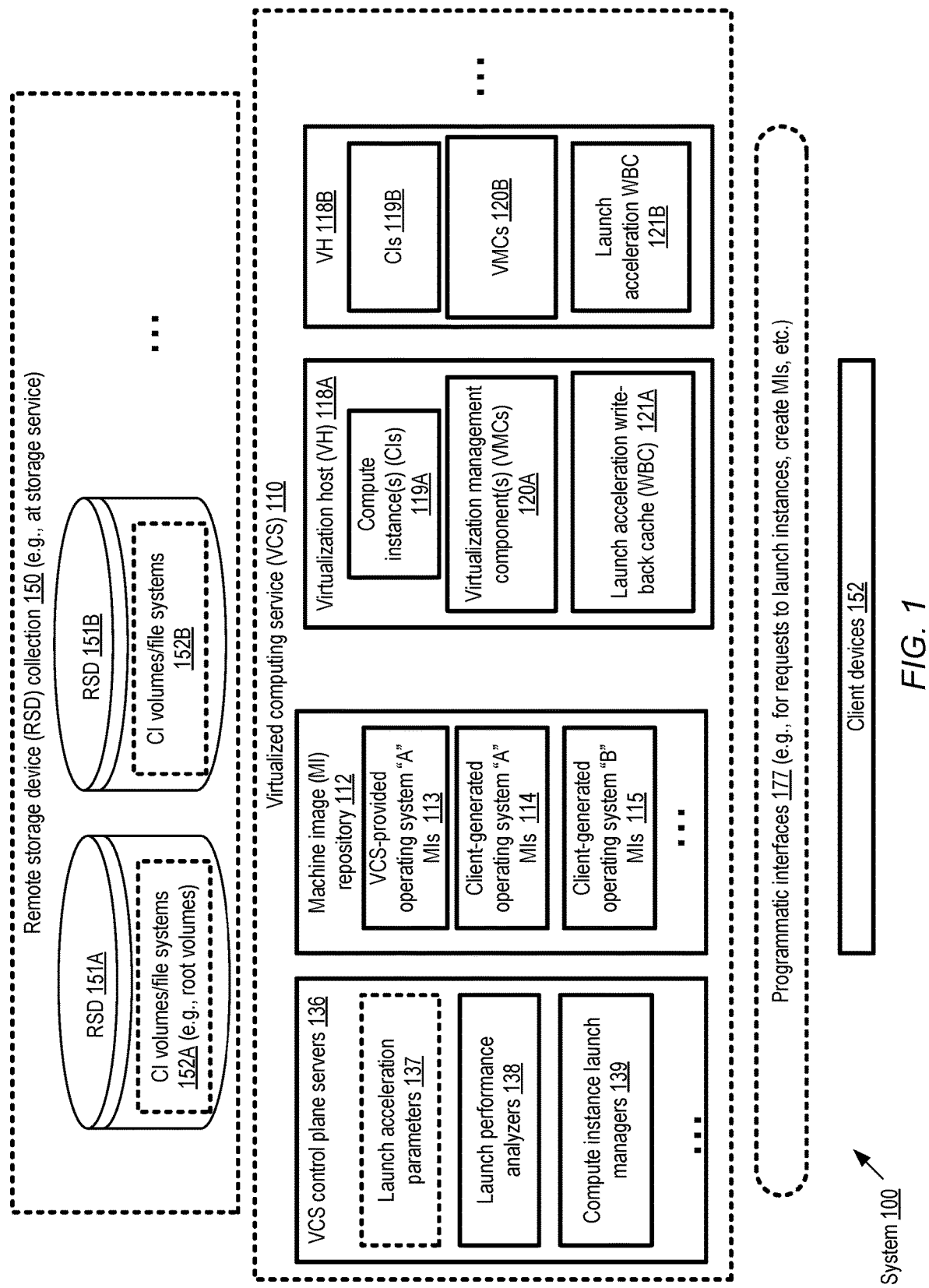
FIG. 1 illustrates an example system environment in which parameterized acceleration of the launches of compute instances may be implemented at a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for accelerating the launches of compute instances at a virtualized computing service, e.g., using parameterized storage-related optimizations. In at least some embodiments, a compute instance such as a guest virtual machine may be set up at a virtualization host of a virtualized computing service (VCS) in response to a launch request from a client of the service. The set of operations performed between the time that a launch request is received, and the time that the corresponding compute instance becomes available for the client (e.g., with a login prompt being provided by the compute instance if desired) may be referred to as a "launch procedure", a "launch sequence" or a "boot sequence" in various embodiments.

A number of factors may influence the duration of a launch procedure, e.g., including the operating system being used for the compute instance, the machine image being used, configuration settings which determine the kinds of storage devices to be used for the compute instance's volumes or file systems, properties of the virtualization host selected for the compute instance, and so on. Other things being equal, shorter launch procedure durations may be preferred to longer launch procedure durations, as client applications on the compute instances may be started up sooner when launch procedures are shorter. The launch procedures for some instances that use remote storage devices may include phases, typically early on in the launch procedure, in which numerous writes are directed to the remote storage devices, and subsequent operations after a given write have to wait until the write completes. These communications can introduce latency into the launch procedures, for example up to several minutes per launch.

The disclosed techniques can reduce launch procedure durations for at least some compute instances having remote storage using temporarily-configured write-back caches. According to the present disclosure, memory is dynamically allocated, e.g., using peripheral cards of the virtualization hosts, for a write-back cache to be used during an early phase of such instance launches. During the early phase, write completion responses can be provided as soon as the written data is cached, and the writes are propagated to remote storage asynchronously. After the early phase in which caching is most beneficial, the caching can be disabled for the rest of the launch, and the memory that was allocated for the cache is released. Such write-back caches may, for example, reduce the time taken for certain expensive I/O (input/output) operations performed during early stages of a launch procedure by up to an order of magnitude in some cases, greatly reducing the overall time taken before the compute instance being launched becomes usable.

Various parameters associated with the caches (such as cache size, the time period for which write-back caching is to be used during the launch procedure, etc.) may be determined based on automated measurement and analysis in some embodiments. In at least one embodiment, the write-back caches may be configured using memory buffers that are already available at pre-configured devices such as peripheral cards of the virtualization hosts, and the memory buffers allocated for the caches may be freed as soon as an early stage of the launch procedure completes; as a result, the benefits of using the write-back caches may be obtained without requiring any additional hardware to be provisioned. Other optimizations involving temporary changes to storage replication parameters at the remote storage devices, which may also help to accelerate launches for some types of compute instances, may be utilized separately or in combination with the write-back caches in some embodiments.

As one skilled in the art will appreciate in light of this disclosure, certain embodiments may be capable of achieving various advantages and practical applications/benefits, including some or all of the following: (a) significantly reducing the time taken to start up compute instances such as virtual machines, thereby enabling useful work to be initiated at the compute instances faster, (b) improving the utilization levels of servers used for such compute instances, e.g., by shortening the time periods in which the servers wait for I/O operations to complete, and (c) enhancing the user experience of clients on whose behalf the compute instances are set up, e.g., by providing feedback faster in response to compute instance launch requests.

According to at least some embodiments, a system may comprise one or more computing devices. The devices may include instructions that upon execution on or across one or more processors cause the one or more devices to obtain an indication of a particular machine image to be used for launching one or more compute instances, e.g., using one or more virtualization hosts of a virtualized computing service. In accordance with configuration settings of the machine image and/or the virtualization hosts, and/or based on preference indicated in specific launch requests, remote storage devices may have to be accessed from the virtualization hosts over a network during the launch procedures of at least some of the compute instances for which the machine image is to be employed. For example, as one of the alternatives offered by a virtualized computing service in some embodiments, the root volume and/or root file system of a compute instance may be set up using a storage service that provides block-level I/O interfaces, and the storage nodes of such a storage service may be accessed via network connections from the virtualization hosts. Note that in some embodiments, it may also be possible for some compute instances to be configured without utilizing remote storage devices for their file systems or volumes—e.g., a virtualization host may comprise local storage devices including solid-state drives (SSDs) or rotating disks which can be used for the file systems or volumes. However, in at least some embodiments, there may be significant benefits to using the remote storage devices for compute instance storage volumes and files, including for example higher levels of data durability, fault tolerance and the like resulting from automated replication algorithms of the storage service.

Based at least in part on an analysis of the machine image, one or more launch acceleration parameters for the machine image may be determined in various embodiments. Such parameters may include, among others, a write-back cache size and a caching interval or duration. At a particular virtualization host at which the machine image is to be used to launch a compute instance, one or more memory buffers may be allocated for a local write-back cache in some embodiments. In at least one embodiment, some or all of the virtualization hosts to be used for the compute instances may include respective virtualization management offloading cards (VMOCs), at which some of the tasks of virtualization management are offloaded from the primary processors or CPUs of the hosts, and such VMOCs may comprise memory which can be dynamically allocated for write-back caches. In some embodiments, such VMOCs, which may also be referred to as virtualization offload cards, may be linked to a primary processor of the corresponding virtualization host via a peripheral interconnect such as a PCIe (Peripheral Component Interconnect-Express) bus. Other types of devices comprising dynamically allocatable memory may be used for the write-back caches in some embodiments. In various embodiments, the amount of memory allocated for the buffer(s) of the write-back cache may be based at least in part on the write-back cache size which was determined via the automated analysis of the machine image.

During the launch procedure of a compute instance at a virtualization host at which a write-back cache has been set up, at least some writes may be directed to one or more remote storage devices from one or more processes or threads participating in the launch operations in various embodiments. In some implementations, an acknowledgement or indication that a requested write has been completed may be required before a subsequent operation of the launch procedure can commence. In some embodiments, a write-back caching interval (whose duration is based on a parameter identified earlier using an analysis of the machine image) may be initiated at or near the beginning of the launch procedure; that is, write-back caching may only be employed during the early stages of the launch procedure, before the pre-determined caching interval expires. In response to a write request directed to a particular remote storage device prior to the expiration of the caching interval, in various embodiments (a) a payload of the write request may be stored in the memory buffer(s) allocated for the write-back cache, and (b) an indication of fulfillment of the write request (i.e., the equivalent of a write completion response) may be provided to the source of the write request without obtaining an acknowledgement that the payload has also been stored at the remote storage device to which it was directed. Such an indication of fulfillment may comprise, for example, a return value indicating success of an invocation of an application programming interface (API) used to submit the write request, provided to the software process or thread which submitted the write request while implementing at least a portion of the launch procedure. In effect, the payloads of such writes may be intercepted and stored temporarily in the write-back cache. As a result, the subsequent operations of the launch procedure may be commenced without waiting to receive an acknowledgement from the remote storage device, thereby speeding up the launch procedure in such embodiments. In at least some embodiments, one or more write propagation managers may asynchronously transmit the write payloads from the write-back cache to the remote storage device, e.g., as a background task, and receive corresponding acknowledgements from the remote storage device.

After the caching interval expires, in at least some embodiments the memory buffers that were designated for the write-back cache may be freed or released, so that the memory may be used for some other purpose if needed (such as virtualization management tasks). The payloads of additional writes (if any) directed to the remote storage device during the launch procedure after the caching interval expires may be transmitted, e.g., synchronously, to the remote storage device without being cached at the buffers in some embodiments. Depending on the selected caching interval, memory may thus be set aside only briefly for the write-back cache in various embodiments.

In at least some embodiments, the write-back cache may be configured only for a subset of compute instance launches—e.g., for compute instances instantiated using machine images whose launch procedures comprise a selected minimum number of synchronous writes to remote storage. In some embodiments, it may be the case that the number of such synchronous writes is higher the very first time that a compute instance is launched at a particular virtualization host than the number of such synchronous writes required for subsequent re-launches at the same host, and write-back caching may only be used for such "first-time" launches for a given (machine image, host) combination. In one embodiment, metadata records may be maintained (e.g., at a control plane component of the VCS) regarding whether a given machine image has been used to launch one or more compute instances at a given virtualization host. When a request to launch a compute instance using a specified machine image is received, and a particular virtualization host is selected for the instance, a determination may be made (e.g., using the metadata records) in some embodiments as to whether the machine image has previously been used to launch one or more other compute instances at that virtualization host, and memory for write-back caching may only be allocated if the specified machine image has not been used previously to launch one or more compute instances at the selected virtualization host. Thus, for example, consider a scenario in which, during the first launch of a compute instance using an image MI1 at a virtualization host VH-A, the number of synchronous writes directed to remote storage is N1, and that if the compute instance is terminated and restarted at the same host, the number of synchronous writes directed to the remote storage is N2. This type of behavior may occur if, for example, a system preparation phase of the first launch (the one in which N1 synchronous remote writes are requested) only has to be run once at a given host such as VH-A; once the system preparation phase has been completed, its results may be stored in permanent storage from which they can be retrieved quickly for subsequent launches, and the system preparation step may not be needed again at the host. In this example scenario, in some embodiments if N1 exceeds a pre-determined threshold parameter but N2 does not, the write-back cache may only be configured for the very first launch using MI1 at VH-A. Of course, if both N1 and N2 exceed the threshold, write-back caching may be used for subsequent launches as well as the first launch.

In at least some embodiments, the use of write-back caches in the manner described above may be accompanied by a slightly higher risk of failed launches—e.g., if a failure occurs at the cache prior to the completion of the caching phase, one or more of the writes may not have been persisted to the targeted remote storage device, which may lead to an inconsistent state and may require re-launching of the compute instance. Note that at least in some embodiments, the write-back cache may itself be configured for high availability and fault resilience, making launch failures due to cache-related causes highly improbable. Even though the probability of such failures may be extremely low, and even though the amount of lost time or resources resulting from such failures may be small (if write-back caching is performed only in a short initial part of the launch procedure), in various embodiments there may be a trade-off between (a) reducing launch durations and (b) slightly higher probabilities of launches having to be re-initiated. According to some embodiments, e.g., to provide flexibility to clients in the presence of such trade-offs, clients of a virtualized computing service may be able to programmatically indicate whether write-back caching is to be employed for a compute instance or not. For example, by default, the service may not enable write-back caching during launch procedures, and the client may request write-back caching if desired by changing a parameter setting associated with the machine image or by including a launch-phase caching-related parameter in a launch request.

According to some embodiments, the virtualized computing service may include image analysis managers or tools that obtain performance measurements with respect to various machine images to help determine the amount of memory to be set aside for the write-back caches and/or the caching intervals to be used. For example, a client may provide an indication that a particular machine image MI1 is likely to be used for some number of compute instances, and the analysis managers may measure the remote synchronous write payload sizes, the number of remote write requests, the subsets of the overall (un-cached) launch procedure duration during which most of the remote synchronous writes occur, and so on. Such measurements may then be used to determine various parameters of the write-back caching technique, including a cache size, the caching interval, and so on. In at least some embodiments, the occurrence of a particular event during a launch procedure may serve as a signal that write-back caching is no longer likely to be beneficial during the remainder of the launch procedure, and such an event may be identified during analysis of a launch using the machine image by the computing service's analysis managers. For example, remote synchronous writes may typically be requested most frequently before a root volume or root file system for the compute instance has been created at a targeted remote storage device, and remote writes may be less frequent after the root volume or file system has been set up. The analysis managers may measure the time taken between the start of the launch procedure and the completion of the configuration of the root volume or file system in such an embodiment, and use the measurement to set the caching interval, since the marginal benefit of continuing write-back caching after the root volume/file system has been set up may be low. In some embodiments, one or more restarts or reboots of the compute instance may be performed after the root volume or file system has been set up, and the approximate time between the start of the launch procedure and such a first restart/reboot may be set as the caching interval using similar logic. In some embodiments, the criterion for terminating write-back caching may be expressed simply as a time interval or time period from the start of the launch procedure (e.g., T seconds). In other embodiments, a criterion expressed as a detection of an event may be used—e.g., write-back caching may continue until the first re-boot after the launch procedure was initiated, or until the completion of the configuration of a volume or file system. Note that the caching interval and/or cache size may differ for respective machine images—some machine images may require more synchronous remote writes than others, or synchronous remote writes that are spread over a longer interval than in the case of other images.

According to at least some embodiments, during a launch procedure in which write-back caching is employed, a signal may be sent to an administrative or control plane component of the virtualized computing service when the write-back caching phase of the launch procedure is terminated. Such a sequence may in effect indicate to the control plane that the instance being launched has reached a "safe harbor" stage with respect to durability of the requested writes, in that the probability of a loss of a write payload that has not been propagated to the remote storage device safely may have reached zero (or very close to zero). As such, the signal may indicate that a re-launch of the same instance due to write-back caching related problems is unlikely, and the control plane may be able to release some resources that could otherwise have been used to manage such a re-launch. If a failure is detected prior to the completion of the write-back caching phase of the launch procedure, in at least some embodiments the launch may be abandoned and re-initiated.

Example System Environment

FIG. 1 illustrates an example system environment in which parameterized acceleration of the launches of compute instances may be implemented at a virtualized computing service, according to at least some embodiments. As shown, system 100 may comprise resources and artifacts of a virtualized computing service (VCS) 110 and a collection of remote storage devices 150. The VCS 110 may comprise a set of administrative or control plane servers 136, a machine image (MI) repository 112, as well as a collection of virtualization hosts (VHs) 118 (e.g., VH 118A and VH 118B) at which compute instances 119 (e.g., 119A and 119B) may be configured on behalf of VCS clients in the depicted embodiment.

The VCS 110 may implement one or more programmatic interfaces 177 in various embodiments, such as web-based consoles, a set of application programming interfaces (APIs), command line tools, and/or graphical interfaces. The programmatic interfaces 177 may be utilized by clients of the VCS 110 to submit various types of compute instance configuration-related requests from client devices 152 (e.g., laptops, desktops, mobile computing devices, phones, etc.), including requests to launch compute instances, requests to register machine images for launching the instances, requests to obtain measurements from machine images that can later be used to accelerate instance launches, and so on.

The VCS control plane servers 136 may comprise one or more compute instance launch managers 139 as well as one or more launch performance analyzers 138 in the depicted embodiment, e.g., each comprising a collection of hardware and software at one or more computing devices. The launch managers 139 may orchestrate the process of launching compute instances requested by clients of the VCS, e.g., by selecting an appropriate virtualization host 118 on which an instances is to be launched, transferring a machine image (MI) to the virtualization host if needed, and/or causing a virtualization management component (VMC) 120 (e.g., 120A or 120B) at the virtualization host to begin the launch procedure of a requested instance. In at least some embodiments, one or more of the virtualization hosts may comprise a respective launch acceleration write-back cache (WBC) 121 such as WBC 121A or 121B, e.g., each comprising a portion of memory from which buffers of various sizes can be dynamically allocated for speeding up I/O operations during launch procedures.

In various embodiments, the VCS 110 may enable clients to specify, e.g., using the programmatic interfaces 177, the particular machine image (MI) to be used to launch one or more requested compute instances. In the depicted embodiment, the MI repository 112 of the VCS may comprise a plurality of MIs, such as MIs 113, 114 or 115. Some of the machine images may be prepared at the VCS control plane, e.g., to enable various types of "standard" or "baseline" compute instances to be set up on behalf of clients that do not necessarily wish to create their own MIs. For example, MIs 113 may comprise VCS-provided machine images that implement a particular operating system "A". In at least some embodiments, clients may generate their own MIs and register them within repository 112. For example, a VCS client may request the launch of a compute instance using a standard or baseline MI, customize the instance's properties for the client's applications, and then generate a variant of the baseline MI (e.g., using a snapshot creation request) that can then be used for additional compute instances. MIs 114 may include one or more machine images, generated by clients, that also implement a version of operating system "A", while MIs 115 may implement a different operating system "B" and may also have been stored at the repository 112 on behalf of VCS clients. In at least some embodiments, one or more MIs may be generated by third party vendors and registered or stored at the MI repository, and such third party MIs may also be used to launch compute instances at the request of VCS clients.

In some embodiments, a number of persistent storage device type options may be supported at a VCS 110 for compute instances. Some VHs 118 may, for example, comprise local SSDs (solid state drives) and/or local rotating disk devices which may be used for volumes and file systems of the instances if desired. Configuration settings of at least some MIs and/or VHs may require that one or more remote storage devices (RSDs) 151 (e.g., RSD 151A or 151B of an RSD collection 150), accessed over network connections or pathways from the VHs, be used for at least some volumes and/or file systems of the compute instances launched using those MIs or those VHs. For example, a set of CI volumes or file systems 152A (including for example root volumes or root file systems) of one or more CIS 119 may be configured at RSD 151A in the depicted embodiment, and a set of CI volumes or file systems 152B of other CIs may be established at RSD 151B. In at least some embodiments the RSD collection 150 may be implemented at a storage service which automates many types of storage administration tasks and provided high levels of data durability, resilience to failures, and so on, so it may be advantageous to utilize the RSDs instead of local storage devices for important instance configuration and application data.

An indication that a particular MI (e.g., an MI 113, 114 or 115) is going be used for launching one or more compute instances may be obtained at the VCS control plane servers 136 in various embodiments. Furthermore, configuration settings of the particular MI and/or the VHs available for the MI, or preferences regarding CI storage configuration settings (such as remote root volume requirement settings) may indicate that a remote storage device 152 is to be accessed from a VH over a network during the launch procedure of at least some compute instances which use the particular MI in such embodiments. One or more acceleration parameters for the launch procedures, including for example a write-back cache size and/or a caching interval, may be determined in various embodiments, e.g., by a launch performance analyzer 138 based at least in part on measuring an un-accelerated or baseline launch using the particular MI. Different parameter values may be identified for respective MIs in some embodiments—e.g., the cache size and/or caching interval for an MI 114 may differ from the corresponding parameter values for an MI 115. In some embodiments, such measurement based parameter value selection may be performed as soon as an MI is registered or stored at the repository 112, e.g., in advance of requests to launch compute instances using the MI. In one embodiment, in which for example an MI is identified for a launch shortly before the launch request, and the VCS control plane is not provided sufficient time to determine custom acceleration parameters for the MI, a default set of acceleration parameters may be used (e.g., the same acceleration parameters which were determined earlier for a similar MI may be selected).

When a request to launch a particular CI using the MI is received at the VCS control plane from a client, a VH 118 comprising one or more devices at which memory can be allocated dynamically for launch acceleration-related write-back caching may be identified for the CI. From the amount of memory available, one or more buffers may be allocated as a write-back cache (WBC 121) for the launch in various embodiments, with the amount of memory being selected based on the pre-determined write-back cache size and/or the total amount of available memory at the devices. Any of a number of different types of devices may be used for the WBCs 121 in different embodiments. For example, in some embodiments, the virtualization management components 120 at a VH 118 may comprise one or more virtualization management offloading cards (VMOCs) designed to reduce the virtualization administration-related overhead on the primary processors or CPUs of the host, and such cards may include memory which can be allocated dynamically for such WBCs 121. In other embodiments, VHS 119 may include a non-volatile RAM (NVRAM) memory, e.g., normally used for accelerating I/O operations directed to local persistent storage devices, and such memory may be employed for the WBCs 121. In some embodiments, a WBC 121 may be set up at an intermediary device reached from the VH over a short network link, such that the latency for I/O operations to the intermediary device is much smaller than the latency for I/O operations to the RSDs.

The launch procedure of the requested compute instance 119 may be subdivided into phases with respect to the use of the write-back cache 121 configured for the instance in at least some embodiments, including for example at least one initial caching phase (of a duration corresponding to the pre-determined caching interval), and at least one post-caching phase. In response to a write request directed to a particular RSD 152 from the VH prior to the expiration of the caching interval, in various embodiments a payload of the write request may be stored in a buffer of the one or more memory buffers allocated for the WBC 121, and an indication of completion or fulfillment of the write request may be provided (e.g., to a thread or process of the VMCs 120 which is coordinating the launch procedure) independently of obtaining an acknowledgement that the payload has also been stored at the targeted RSD. The write payloads stored in the WBC 121 may be asynchronously transferred or flushed to the targeted RSD, e.g., as part of a background task associated with the WBC. In at least some embodiments, the launch procedure may include one or more reads of the recently-written data that was targeted to an RSD, and such reads may be satisfied using the WBC 121 if possible.

After the caching interval has expired, in some embodiments the memory that was allocated for the WBC 121 of the in-progress launch may be freed or released, e.g., so that it can be used for accelerating other launches if needed, or so that it can be used for some other purpose. In other embodiments, the memory may not necessarily be released (e.g., if the memory is not required for any other purpose), even after the write payloads are flushed to the RSDs 152, at least until the entire launch procedure is completed, or for the lifetime of the compute instance. In one embodiment, the memory buffers allocated to a given launch procedure may only be released in demand, e.g., if (a) the caching interval has expired and (b) insufficient memory is available for a memory operation initiated by a virtualization management component 120. In some embodiments, an amount of memory may be set aside for launch-related write-back caching for the lifetime of the virtualization host, so dynamic allocation of memory for the caching may not be required.

One or more additional writes directed to the RSDs 152 may be initiated as part of the launch procedure in at least some embodiments after the caching interval has expired—that is, the expiration of the pre-determined caching interval may not necessarily indicate that no more remote writes are to be performed. If such writes are initiated, the write payloads may not be cached at WBCs; instead, the payloads may be transferred to the RSDs synchronously in various embodiments, and the writes may not be considered complete until an acknowledgement is received from the RSDs. As such, the write operations directed to the RSDs during the launch procedure as a whole may be considered bi-modal in such embodiments: during an initial caching phase, the writes may be acknowledged as soon as their payloads are stored in the WBCs, while in the post-caching phase, the writes may only be acknowledged after the payloads have reached the RSDs. In some embodiments, in order to achieve desired levels of data durability, availability and the like, write payloads may typically be replicated at the collection 150 of RSDs (e.g., at a primary and a secondary RSD) before they are acknowledged, although such replication constraints may be relaxed during launch procedures as discussed below in further detail. In some embodiments, during the caching phase (i.e., prior to the expiration of the caching interval) write payloads that have been stored in a WBC may not necessarily be propagated to the RSDs 152 in the same order in which the corresponding write requests are issued; however, after the caching phase is complete, write payloads of subsequent writes may be propagated and stored at the RSDs in the same order as they are requested.

In some embodiments, the use of write-back caching for CI launches may be conditional: e.g., write-back caching may only be utilized the first time that a particular MI is used to launch a CI 119 at a given VH 118, as such first-time launches may for example include system preparation operations which involve numerous writes to remote storage devices. In one such embodiment, the launch managers 139 may be provided access to VCS control plane metadata which indicates whether a given MI has previously been used to launch a CI at a VH, and such metadata may be used to decide whether to allocate write-back cache memory for a given launch.

In at least some embodiments, VCS clients may submit programmatic requests via interfaces 177 to request that launch procedures for their instances be accelerated using WBCs 121. Accordingly, the compute instance launch managers 139 may select WBC-supporting VHs for such instances. In some embodiments, clients may submit MI launch measurement requests programmatically, and in response the launch performance analyzers may obtain metrics (including I/O operation counts and/or I/O operation response times) using specified MIs that can be used to set launch acceleration parameters such as cache sizes and intervals. In one embodiment, the termination of the caching phase may be time-driven—for example, the caching interval parameter may be specified as a number of seconds from the start of the launch procedure. In other embodiments, an event-driven approach may be used, in which instead of stopping the use of the WBCs after a pre-selected amount of time has elapsed during a given instance launch procedure, the WBCs may be used until a pre-specified event (such as a first re-boot, or the completion of the configuration of a root volume or root file system of the compute instance being launched) is detected. In some embodiments, e.g., to indicate that a given launch procedure has reached a post-caching stage in which remote writes will be transferred in the order in which they are issued, a notification may be provided to the VCS control plane from a VH when the WBC use is discontinued during a launch procedure.

Example Compute Instance Launch Procedure Timeline

Figure 2:
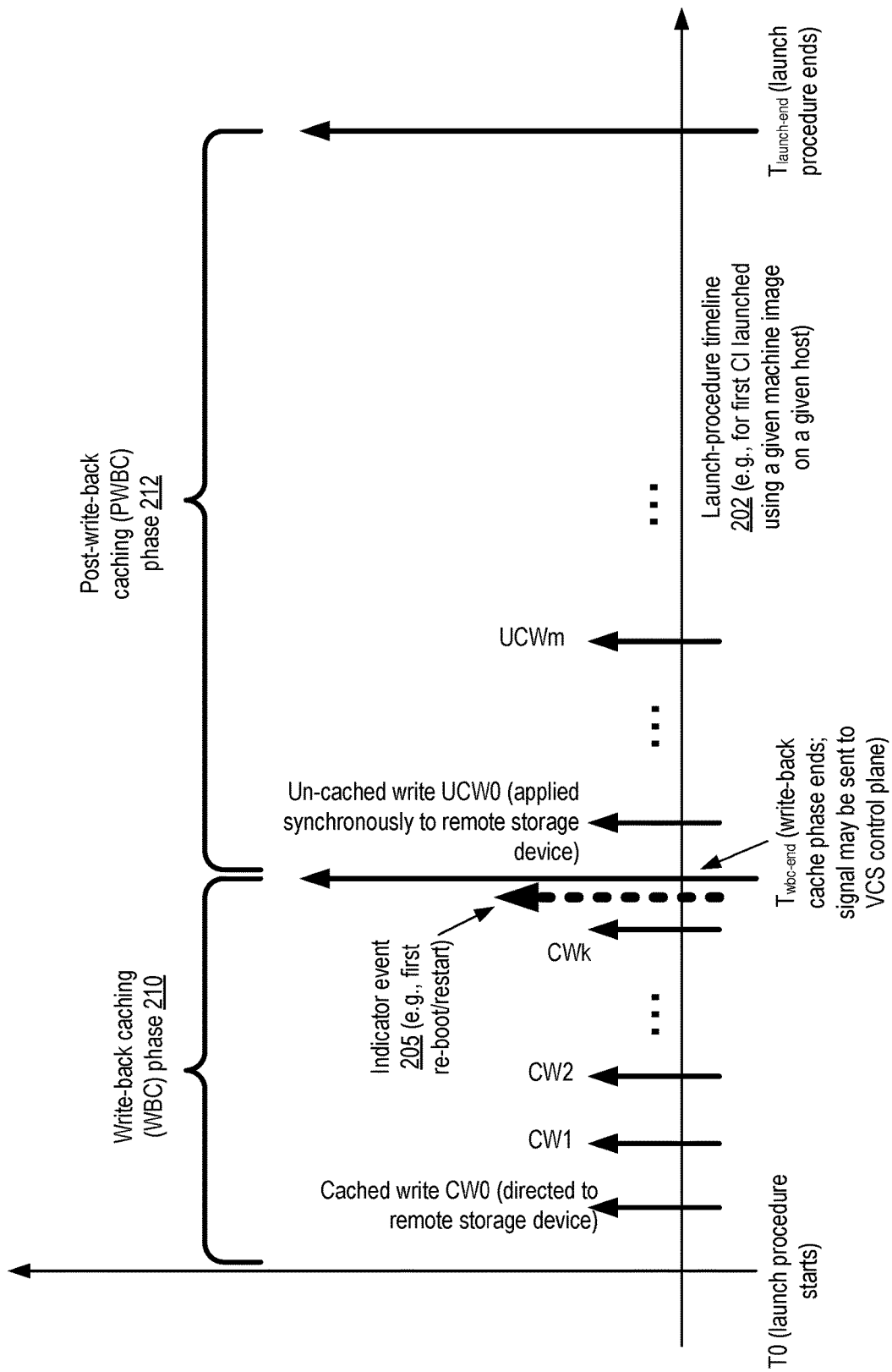
FIG. 2 illustrates an example timeline of a launch procedure of a compute instance, including a phase in which input/output operations directed at a remote storage device may be accelerated using a write-back cache, according to at least some embodiments.

FIG. 2 illustrates an example timeline of a launch procedure of a compute instance, including a phase in which input/output operations directed at a remote storage device may be accelerated using a write-back cache, according to at least some embodiments. In the depicted embodiment, the launch procedure of a particular compute instance, shown using timeline 202, starts at time T0 and ends at time Launch-end. The launch procedure is divided into two phases: a WBC (write-back caching) phase 210, followed by a post-WBC phase 212. The post-WBC phase may also be referred to as a write-through phase.

During the WBC phase, a number of write operations may be directed to one or more remote storage devices in the depicted embodiment. The payloads of the writes may be cached at a write-back cache, which may comprise one or more memory buffers that are dynamically allocated for the launch procedure. The latency for completing a write to the cache may be significantly (e.g., an order of magnitude) smaller than the latency for completing a write to the remote storage device in the depicted embodiment, and an indication that the write is complete may be provided as soon as the write payload reaches the cache. CW0, CW1, CW2 and CWk all represent examples of such cached writes. The payloads of the CWs may be propagated to the remote storage device asynchronously from the write-back cache, as discussed in further detail below with respect to FIG. 3.

WBC phase 210 may end at time $T_{wbc-end}$ in the depicted embodiment. In some embodiments, the duration of the WBC phase 210 may be specified, e.g., by the control plane of the virtualized computing service, as a particular number of seconds or minutes. In at least some embodiments, the occurrence of a special indicator event 205, such as the start of the first re-boot of the compute instance since the launch procedure was initiated, may represent a signal that write-back caching is not required for the remainder of the overall launch procedure—that is, the WBC phase may end when the indicator event is detected. In some embodiments, detections of the indicator event 205 during measurements of launches involving the use of respective machine image may be used to select values of the caching interval parameters for the machine images.

After $T_{wbc-end}$, subsequent writes directed to remote storage devices may not be cached in the depicted embodiment. For example, the write payloads of un-cached writes (UCWs) UCW0 and UCWm may be applied synchronously to their targeted remote storage device, with the corresponding indications of write completion only being provided after the write payloads have been stored at the remote storage device. In the WBC phase 210, it may sometimes be the case that the order in which a write completion indication is provided may differ from the order in which the corresponding write payload is stored at the targeted remote storage device—e.g., the contents of CW2 may be propagated to the remote storage device before the contents of CW1. In contrast, the contents of un-cached writes in the post-WBC phase 212 may reach the remote storage device in the order in which the un-cached write requests were issued. In at least some embodiments, write back caching may be most beneficial for the very first launch of a compute instance using a given machine image at a particular virtualization host, e.g., because the number of writes directed to the remote storage device may be higher for such first-time-on-host launches than for subsequent launches using the same machine image on the same host.

In some embodiments, the launch procedure of a compute instance may comprise more than one write-back caching phase, with individual ones of the caching phases followed by a phase during which write-back caching is not used. In some such scenarios, the VCS control plane may determine the parameters which govern the starting times and ending times of the various caching intervals, the amount of memory to be allocated for each caching interval, etc.

Asynchronous Write Propagation During Launch Procedures

Figure 3:
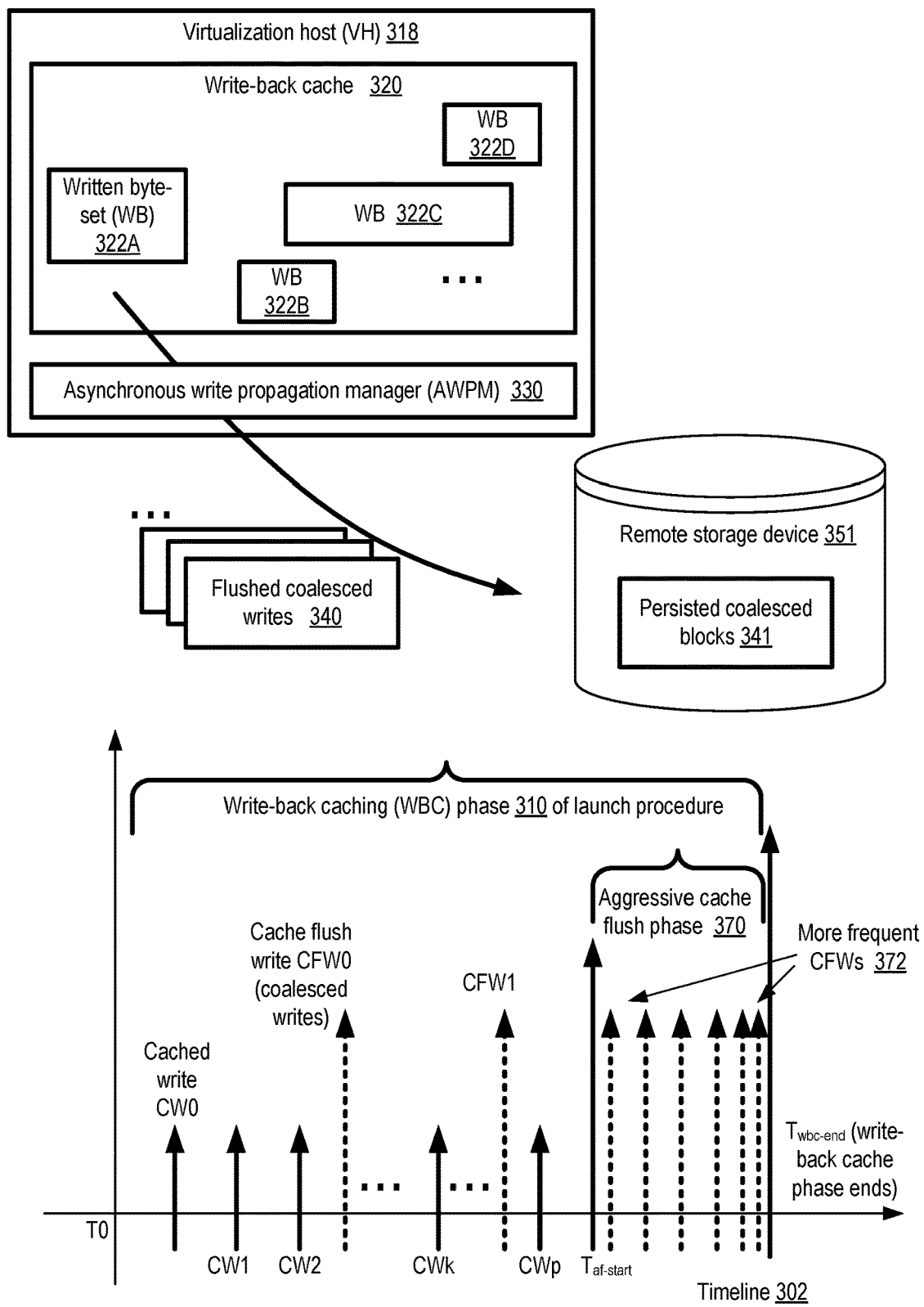
FIG. 3 illustrates example operations of an asynchronous write propagation manager of a virtualization host at which a write-back cache for launch acceleration is configured, according to at least some embodiments.

FIG. 3 illustrates example operations of an asynchronous write propagation manager of a virtualization host at which a write-back cache for launch acceleration is configured, according to at least some embodiments. In the depicted embodiment, a virtualization host 318 comprises a write-back cache 320 in which payloads of one or more writes directed to a remote storage device 351, represented as written byte-sets (WBs) 322 (e.g., WB 322A, 322B, 322C or 322D) may be stored temporarily during a caching phase of a launch procedure. In at least some embodiments, the amount of data written in some write operations may differ from the amount of data written in other writes—e.g., the number of bytes in WB 322C may be greater than the number of bytes in WB 322B or 322D.

In the depicted embodiment, the remote storage device 351 may be optimized to accept writes that are multiples of a block size, such as 64 kilobytes, 128 kilobytes or the like. The number of bytes actually written in at least some of the writes whose payloads are stored in the cache 320 may not necessarily equal the optimal block size of the remote storage device. An asynchronous write propagation manager (AWPM) 330, comprising for example a process or thread of execution at the virtualization host or the device used for the write-back cache, may be responsible for coalescing WBs 322 and flushing corresponding coalesced writes 340 (e.g., comprising multiple of the optimal block size) to the remote storage device 351 in the depicted embodiment. After an acknowledgement is received by the AWPM 330, indicating that the payload of a particular flushed coalesced write 340 has been stored at the remote storage device 351 (e.g., as a persisted coalesced block 341), in some embodiments the AWPM may store metadata (e.g., by setting a "flushed" bit in the cache's metadata) indicating that the constituent WBs of the write can be removed or replaced from the cache 320 as needed. WBs whose data has not yet been propagated to the remote storage device from the cache may be referred to as "dirty" in some embodiments, while WBs whose data has been propagated may be referred to as "clean".

Timeline 302 illustrates example cache flush writes (CFWs) in addition to cached writes (CWs) which may be performed during the write-back caching phase 310 of a launch procedure. For example, cache flush write CFW0 may be scheduled by an AWPM 330 after CW0, CW1 and CW2, and may comprise a set of bytes that were modified in some combination of CW0, CW1 and CW2. Similarly, CFW1 may be scheduled later, after additional cached writes including CWk have occurred. In the depicted embodiment, the AWPM 330 may initiate CFWs based on any of several criteria—e.g., in response to determining that a pre-selected number of CWs such as CWp have occurred since the last CFW, in response to determining that a number of unflushed bytes in the cache exceeds a threshold, etc. In some embodiments, the maximum rate at which CFWs are scheduled or performed may be governed by a cache flush rate limit parameter, as discussed in further detail below in the context of FIG. 4. In at least some embodiments, the AWPM 330 may initiate an aggressive cache flush phase 370 towards the end of the WBC phase 310, e.g., to ensure that no (or very few) unflushed WBs remain in the cache 330 at the end of the WBC phase (i.e., at time $T_{wbc\text{-}end}$). During the aggressive cache flush phase (shown starting at $T_{af\text{-}start}$, which may be another parameter determined by the VCS control plane based on measurements of launch procedures), the AWPM may schedule CFWs 372 more frequently than prior to the aggressive cache flush phase in various embodiments, e.g., as soon as any additional data is written to the cache. Note that in some embodiments, such aggressive cache flushing may not be used, and the AWPM may continue to schedule CFWs at the same rate, or based on the same criteria, throughout the WBC phase.

In some embodiments, multiple threads of execution (e.g., multiple threads of an AWPM process, or multiple AWPMs) may be used to push dirty data to the remote storage device in parallel. In one embodiment, instead of a "push" model as described above being used to flush dirty bytes to the remote storage device at the initiative of an AWPM running at the virtualization host, a "pull" model may be used, in which an AWPM running at a storage service at which the remote storage device 351 is configured sends requests to the virtualization host for dirty bytes.

Example Launch Acceleration Parameters

Figure 4:
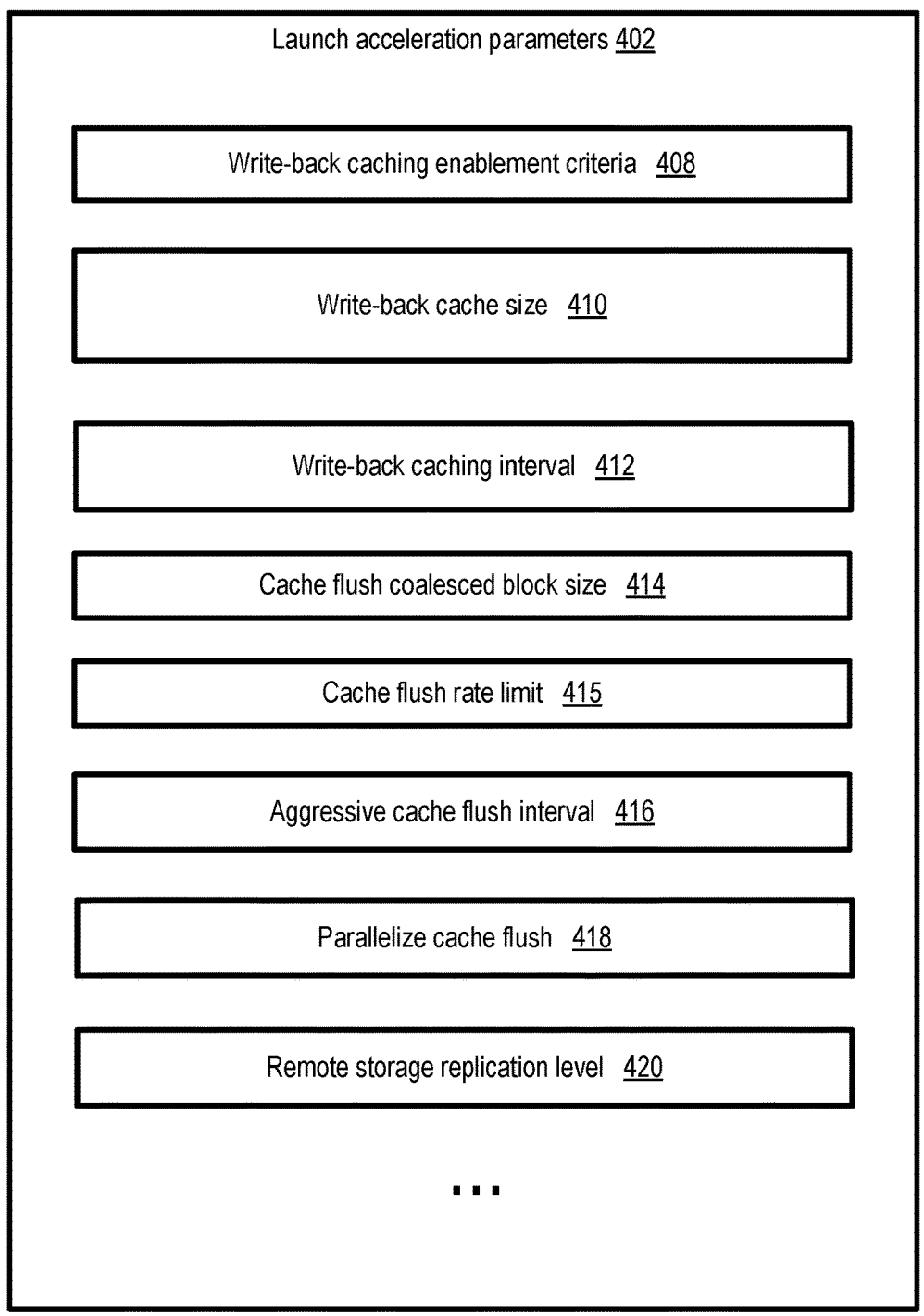
FIG. 4 illustrates example launch acceleration parameters, according to at least some embodiments.

A number of parameters may be used to control the use of write-back caching of the kind described above for accelerating compute instance launches. FIG. 4 illustrates example launch acceleration parameters, according to at least some embodiments. As shown, launch acceleration parameters 302 may comprise, among others, write-back caching enablement criteria 408, write-back cache size 410, write-back caching interval 412, cache flush coalesced block size 414, cache flush rate limit 415, aggressive cache flush interval 416, parallelize cache flush 418, and remote storage replication level 420 in some embodiments.

In at least some embodiments, a virtualized computing service (VCS), similar in functionality to VCS 110 of FIG. 1, may utilize several different classes of virtualization hosts for compute instances, with each class comprising hosts with a respective computing capacity, main memory size, local storage device configuration, and so on. Values for at least some of the parameters 302 may be determined on the basis of (machine image, virtualization host class) pairs. For example, assuming that computing instances can be launched using machine images MI-A or MI-B at hosts of class VHC-K or VHC-L, different parameter values may be used for (machine image MI-A, virtualization host class VHC-K) than are used for (machine image MI-A, virtualization host class VHC-L), (machine image MI-B, virtualization host class VHC-K), or (machine image MI-B, virtualization host class VHC-L). In one embodiment, any of several different storage services or storage device classes may be used for remote storage of compute instances, and different parameter combinations may be selected for respective (machine image, virtualization host class, remote storage class/service) combinations. In some embodiments, as discussed below in further detail with respect to FIG. 5, a component of the VCS control plane may use measurements of launch procedures to determine values of at least some of the parameters 302, including for example the specific criteria to be used to terminate write-back caching during launch procedures, cache sizes, cache flush rate limits, and so on. In at least one embodiment, a client of the VCS on whose behalf compute instances are to be launched may indicate preferred values or ranges for one or more parameters 302.

The enablement criteria parameter 408 may be used in some embodiments to decide whether write-back caching is to be used at all for compute instance launches using a given machine image. For example, if the number of writes directed to remote storage devices is below a threshold indicated in the enablement criteria 408, if the overall time taken to complete the launch procedure without caching writes is below a threshold indicated in the enablement criteria 408, or if the potential reduction in launch procedure duration resulting from using write-back caching is below a threshold, write-back caching may not be enabled in at least some embodiments; otherwise, write-back caching may be enabled.

Write-back cache size parameter 410 may indicate the amount of memory that is to be allocated for a given compute instance's launch procedure in the depicted embodiment. Note that at least in some embodiments, write-back caching may be activated for a given launch even if there is less memory available for the cache than is indicated in the write-back cache size parameter setting—that is, while the cache size parameter may indicate a desired amount of memory, allocating that desired amount may not necessarily be mandatory in such embodiments. In other embodiments, if the amount of memory that is indicated by the write-back cache size parameter 410 is not available for a given launch, write-back caching may not be attempted for that launch.

A write-back caching interval parameter 412 may indicate how long write-back caching is to be used, e.g., at the start of the launch procedure. Values for such a parameter may be expressed in time units (e.g., T seconds) in some embodiments. In other embodiments, an event-based representation may be used for the interval parameter—e.g., instead of indicating that write-back caching is to be performed for the first T seconds of a launch procedure, the parameter may indicate that write-back caching is to be performed for all the writes directed to the remote storage device prior to the first re-boot of the instance, or prior to the completion of the configuration of a root file system or volume.

The cache flush coalesced block size parameter 414 may be used to indicate a minimum amount of data that is to be transmitted to the remote storage device at a time by an asynchronous write propagation manager (AWPM) similar to AWPM 330 of FIG. 3, e.g., at least during time intervals in which aggressive cache flushing is not being performed. The block size parameter 414 may, for example, depend on configuration settings of the remote storage device, the network connections or protocol used for transmitting data to the remote storage device, etc. In some embodiments, a cache flush rate limit parameter 415 may be employed to control the rate at which dirty data can be flushed from the write-back cache to remote storage devices (e.g., during at least a subset of the write back caching phase of a launch procedure). By limiting the maximum rate at which the flushes can occur, the flushing operations may be "smoothed out" or distributed temporally in such a way that other operations being performed during the launch are not prevented from proceeding. If, for example, the flushing rate were not limited, it could be the case that the processing and/or I/O associated with the flush operations may interfere with other operations of the launch—e.g., such launch operations may not be able to acquire resources as quickly as preferred because the resources are being used for flushing. In embodiments in which a cache flush rate limit parameter is used, as unflushed write payloads accumulate in the write-back cache, the propagation of the payloads to the remote storage devices may be throttled (i.e., some of the writes to remote storage may be deferred) to ensure that the rate limit is not exceeded.

Aggressive cache flush interval parameter 416 may be used to indicate if, when and for how long during a write-back caching phase of a launch procedure, dirty data is to be aggressively flushed to the remote storage device. For example, the logical equivalent of the difference between time T0 and time $T_{af\text{-}start}$ along timeline 302 may be indicated via parameter 416 in some embodiments. Note that in at least some embodiments, writes to remote storage may not have to be performed using the cache flush coalesced block size (i.e., the aggressive cache flush interval parameter may in effect override the block size parameter). In at least one embodiment, a different value for cache flush rate limit parameter 415 value may be used for the aggressive flushing phase than is used prior to the aggressive flushing phase. In another embodiment, limits on flush rates may not be imposed during the aggressive flushing.

The parallelize cache flush parameter 418 may indicate whether dirty data is to be flushed to the remote storage device using multiple threads of execution, and if so, how many threads of execution are to be used in at least some embodiments. In one embodiment, the degree of parallelism may be increased during the aggressive cache flush phase, e.g., using an additional parallelism parameter for the aggressive cache flush phase.

In some embodiments, data written to the remote storage devices being used for compute instance storage operations may, at least by default, be replicated before the writes are considered complete. For example, before an acknowledgement of a write of a particular block B1 is provided from the remote storage, a primary replica B1-a, a secondary replica B1-b and a tertiary replica B1-c may have to be stored on three separate persistent storage devices. In at least one embodiment, to help further speed up launch procedures, the replication requirements for the remote storage may be temporarily relaxed—e.g., a remote storage replication level 420 that is lower than the default level may be used for at least the write-back caching phase of a launch procedure.

It is noted that at least in some embodiments, combinations of parameters other than those shown in FIG. 4 may be used to control the acceleration of compute instance launches. For example, an aggressive cache flush interval parameter 416 may not be used in some embodiments, or a parallelize cache flush parameter 418 may not be employed.

Figure 5:
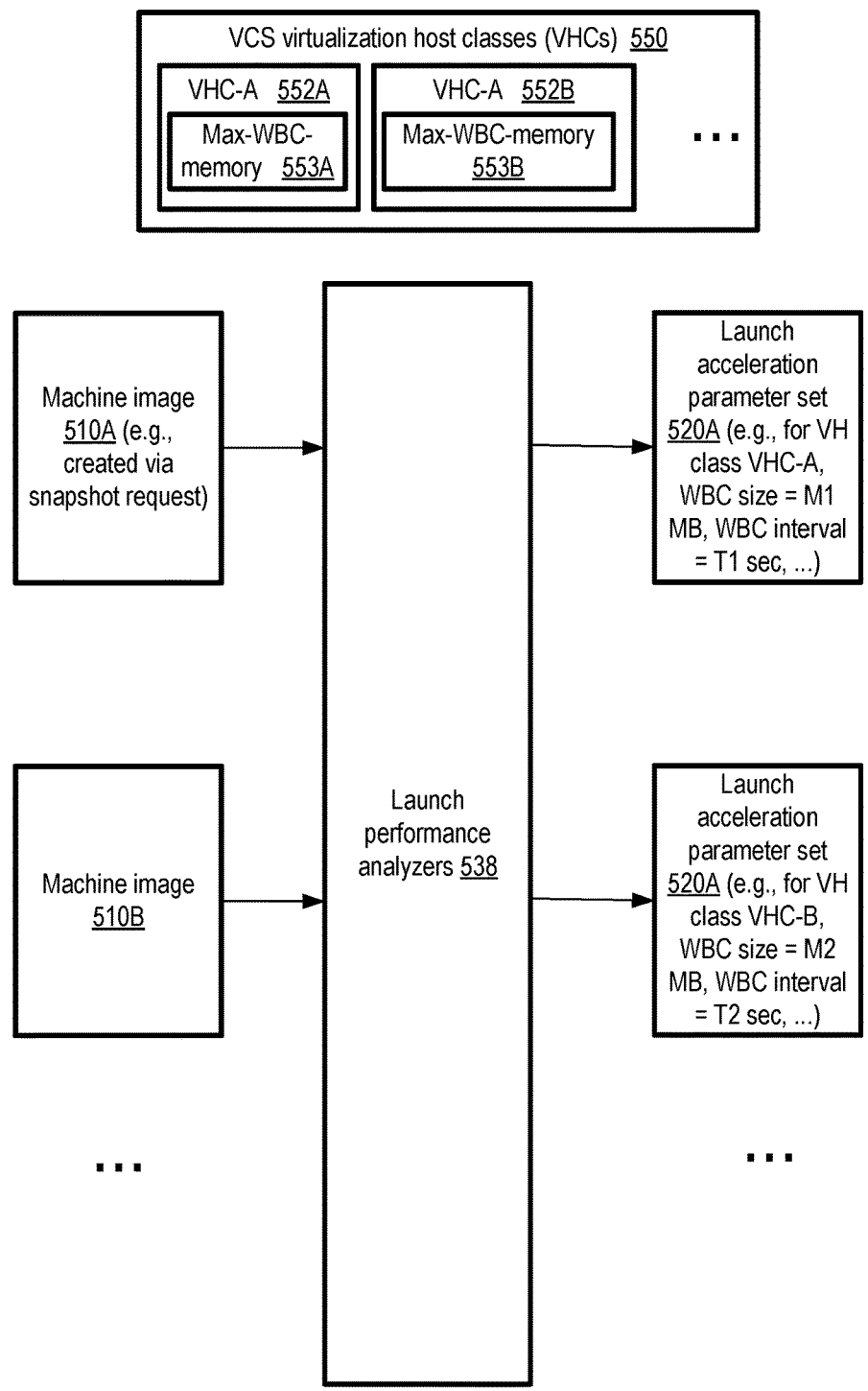
FIG. 5 illustrates an example of automated data driven selection of launch acceleration parameters, according to at least some embodiments.

As mentioned earlier, in at least some embodiments values of one or more of the parameters that govern various aspects of launch accelerations may be selected based on measurements performed at a control plane of a virtualized computing service. FIG. 5 illustrates an example of automated data driven selection of launch acceleration parameters, according to at least some embodiments. In the depicted embodiment, a number of classes 550 of virtualization hosts may be supported at a virtualized computing service (VCS), such as class VHC-A 552A and VHC-B 522B. The hosts of the different classes may differ from one another along several dimensions, e.g., including computing capacity, memory capacity, types of local storage, and/or the availability and maximum memory sizes of respective devices that can be used for setting up write-back caches of the kind described above. In the depicted embodiment, the maximum amount of memory that can be allocated for a write-back cache at a host of class VHC-A (Max-WBC-memory 553A) may be less than the maximum amount of such memory available at a host of class VHC-B (Max-WBC-memory 553B).

For a given machine image (MI) 510A or 510B, which may have been generated in response to a snapshot creation request of a VCS client, a launch performance analyzer 538 of the VCS may run some number of experiments in the depicted embodiment, e.g., by launching compute instances using the MI at hosts of one or more VH classes. During at least some of the experiments, write-back caching may not be used in some embodiments; in other experiments, write-back caching may be used with various combinations of candidate parameter settings during the experiments. A number of metrics may be collected from each experiment, e.g., including the total time for the launch procedure, the number and temporal distribution of writes to remote storage, and so on. Using the metrics, respective launch acceleration parameter sets 520 (e.g., 520A or 520B), may be generated for various combinations of MIs and virtualization host classes by the performance analyzers 538 in the depicted embodiment. For example, parameter set 520A may include a write-back cache size of M1 megabytes and a write-back caching interval of T1 seconds for launches of MI 510A at hosts of class VHC-A, while parameter set 520B may include a write-back cache size of M2 megabytes and a write-back caching interval of T2 seconds for launches of MI 510B at hosts of class VHC-B, and so on. In some embodiments, event-based criteria for terminating write-back caching (e.g., such that a detection of an occurrence of the event during the launch procedure is to be used as an indicator that write-back caching is to be terminated) may be determined in the experiments, e.g., instead of selecting an elapsed time or interval after which write-back caching is to be terminated. The parameter values identified by the performance analyzers 538 may be used for at least some subsequent launch requests in the depicted embodiment.

Example Programmatic Interactions

Figure 6:
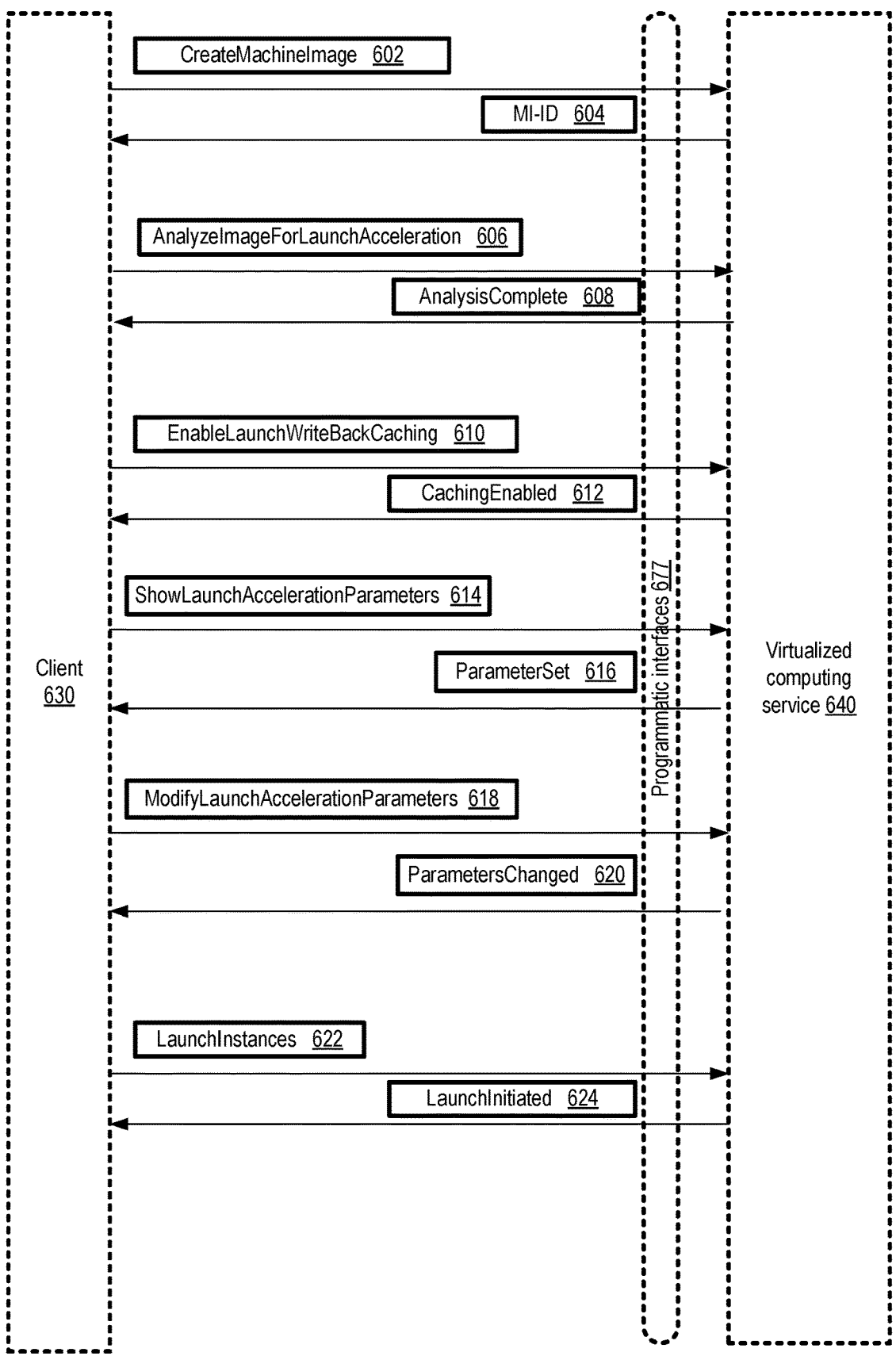
FIG. 6 illustrates example programmatic interactions associated with launch acceleration for compute instances, according to at least some embodiments.

FIG. 6 illustrates example programmatic interactions associated with launch acceleration for compute instances, according to at least some embodiments. In the depicted embodiment, a virtualized computing service 640 (similar in functionality to VCS 110 of FIG. 1) may implement one or more programmatic interfaces 677, such as a set of application programming interfaces (APIs), a web-based console, command-line tools, graphical user interfaces and the like which may be used by VCS clients 530 to submit requests related to the compute instance launches and receive corresponding responses.

A client 630 may, for example, submit a CreateMachineImage request 602 via interfaces 677 to generate a machine image (e.g., from a snapshot of a running compute instance) that can then be used to launch other compute instances. In response, a machine image may be created and stored at the VCS, e.g., at an image repository similar to repository 112 shown in FIG. 1, and an identifier MI-ID 604 of the newly-generated image may be provided to the client.

In at least some embodiments, a client may submit a request 606 to the VCS 640 to analyze a specified machine image for possible launch acceleration. In response, one or more automated experiments (similar to the experiments discussed in the context of FIG. 5) may be run at the VCS, and a set of launch acceleration parameters (similar to at least some of the parameters discussed in the context of FIG. 4) may be obtained based on measurements obtained from the experiments. An AnalysisComplete response 608 may be sent to the client 630 to indicate that the image has been analyzed to identify possible optimizations of launch times in some embodiments. Note that in some embodiments, an AnalyzeImageForLaunchAcceleration request 606 may not be required for at least some images; instead, at least some newly-created images may be analyzed by default at the VCS to determine values for launch acceleration. In one embodiment, before performing an analysis of a particular machine image, the VCS control plane may determine whether the machine image is likely to be re-used for additional launches frequently, and only perform the experiments if a determination is made that the image is going to be re-used frequently. For example, if a machine image MI1 is used to launch at least K instances over a time period T1, a VCS control plane component may designate MI1 as a candidate for launch acceleration, under the assumption that MI1 is probably going to be used for additional launches.

In one embodiment, a client may submit an EnableLaunchWriteBackCaching request 610 to indicate to the VCS that write-back caching should be used for the launches of one or more compute instances. In one embodiment, a parameter associated with a particular machine image indicated in the EnableLaunchWriteBackCaching request 610 may be set to indicate that launches requested using that image should have write-back caching enabled. In other embodiments, a client may use the request 610 to indicate that all the client's subsequent launch requests should have write-back caching enabled if possible. A CachingEnabled response message 612 may be sent to the client to acknowledge the request 610 in some embodiments.

According to some embodiments, a client may request to view at least a subset of the launch acceleration parameters being used on the client's behalf, e.g., by submitting a ShowLaunchAccelerationParameeters request 614. One or more parameter values may be indicated by the VCS in a ParameterSet response. In one embodiment, a client may request changes to current launch acceleration settings (e.g., a longer caching interval may be requested) by submitting a ModifyLaunchAccelerationParameters request 618. If the changes are acceptable, a ParametersChanged response 620 may be sent to the client in some embodiments. Note that in some embodiments the VCS may not necessarily allow values of some or all launch acceleration parameters to be changed at the request of a client.

A LaunchInstances request 622 may be submitted via the interfaces 677 to the VCS by a client 630 to request the establishment of one or more compute instances. In at least some embodiments, a parameter of the LaunchInstances request may indicate that a client is requesting that the launch(es) be accelerated, e.g., using the write-back caching related techniques indicated above. In response, the VCS may select an appropriate virtualization host and initiate the launch procedure (which may include a write-back caching phase, depending on the parameters that are applicable to the launch) at the selected host. A LaunchInitiated message 624 may be transmitted to the client 630 in one embodiment after the launch procedure is initiated. In some embodiment, programmatic interactions other than those shown in FIG. 6 may be supported for requesting various types of launch acceleration related operations.

Example Virtualization Host Supporting Instance Launch Acceleration

Figure 7:
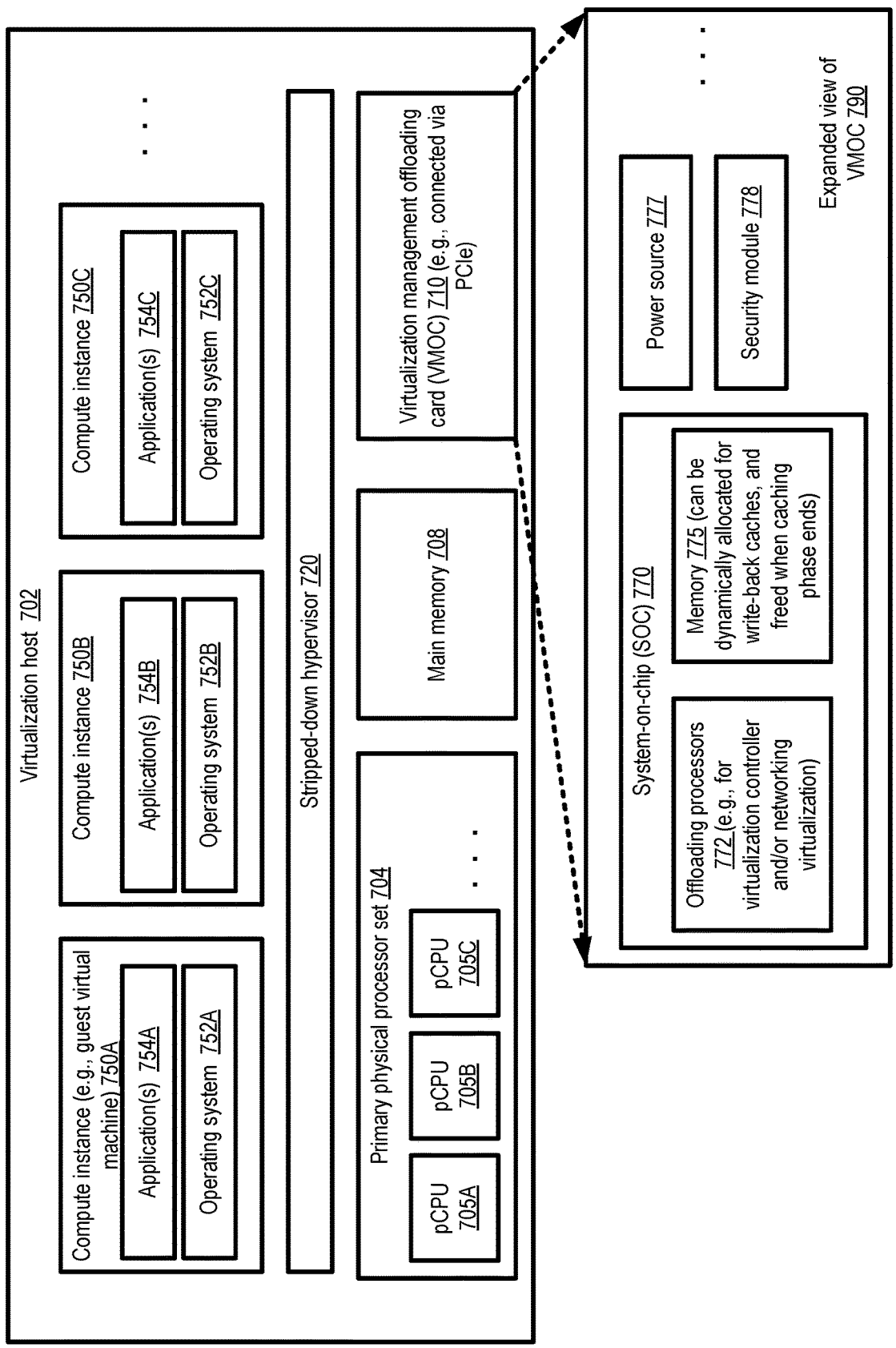
FIG. 7 illustrates example elements of a virtualization host at which launch acceleration of compute instances is supported, according to at least some embodiments.

In some embodiments, a hardware card that is incorporated into a virtualization host for other reasons, e.g., for offloading some types of virtualization management operations, may be used for the write-back caches used to speed up compute instance launches. FIG. 7 illustrates example elements of a virtualization host at which launch acceleration of compute instances is supported, according to at least some embodiments. Virtualization host 702 may comprise, among other elements, a set 704 of primary physical processors such as pCPU 705A, 705B and 705C, a main memory 708, and a virtualization management offloading card (VMOC) 710. The VMOC 710 may be linked to the primary physical processors via a peripheral interconnect such as a PCIe or PCI bus in some embodiments. The software stack of the virtualization host 702 may comprise a stripped-down hypervisor 720, as well as zero or more compute instances 750 (e.g., 750A, 750B or 750C) set up using specified machine images. A given compute instance may include a respective operating system 752 (e.g., 752A, 752B or 752C) and one or more processes implementing applications 754 (e.g., 754A, 754B or 754C) in the depicted embodiment.

The hypervisor 720 may be referred to as being "stripped-down" in the depicted embodiment because at least a portion of the virtualization management functionality traditionally provided by some hypervisors may instead be implemented at the VMOC 710, thus reducing the complexity of the hypervisor itself. For example, the VMOC may comprise a virtualization controller that coordinates at least some aspects of launch procedures of compute instances 750 in one embodiment. In addition, networking-related virtualization management tasks, including buffering messages received from or being sent to network links, as well as translating between (a) network addresses assigned to virtual network interfaces of the compute instances and (b) physical network addresses assigned to hardware network interface cards, may be performed at the VMOC 710 in some embodiments. As shown in expanded view 790, a VMOC may comprise one or more systems on chip (SOCs) 770 in some embodiments, with individual ones of the SOCs 770 in turn comprising one or more offloading processors 772 and a memory 775. The offloading processors 772 may be used to execute the subset of virtualization management tasks that are not performed by the hypervisor using the pCPUs 704 in the depicted embodiment, including the operations of a virtualization controller and/or networking related virtualization management tasks. Instructions executed at the offloading processors may be stored at the memory 775. In addition, in the depicted embodiment, portions of the memory 775 may be dynamically allocated (e.g., by the virtualization controller) as needed for write-back caches of the kind discussed earlier, and freed when the caching phase of a given launch procedure ends. For example, in some embodiments, as a result of the allocation of buffers for a given write-back cache set up to speed the launch of a particular compute instance 750, the total amount of memory 775 available for other virtualization management tasks at the VMOC may be temporarily reduced; however, the memory may be released for use for other tasks as soon as the caching phase is over. The VMOC may also comprise additional elements such as a power source 777, a security module 778 and the like in various embodiments. In at least some embodiments, write-back caches for instance launch acceleration may be established at devices other than VMOCs 710.

Example Multi-Level Launch Optimizations

Figure 8:
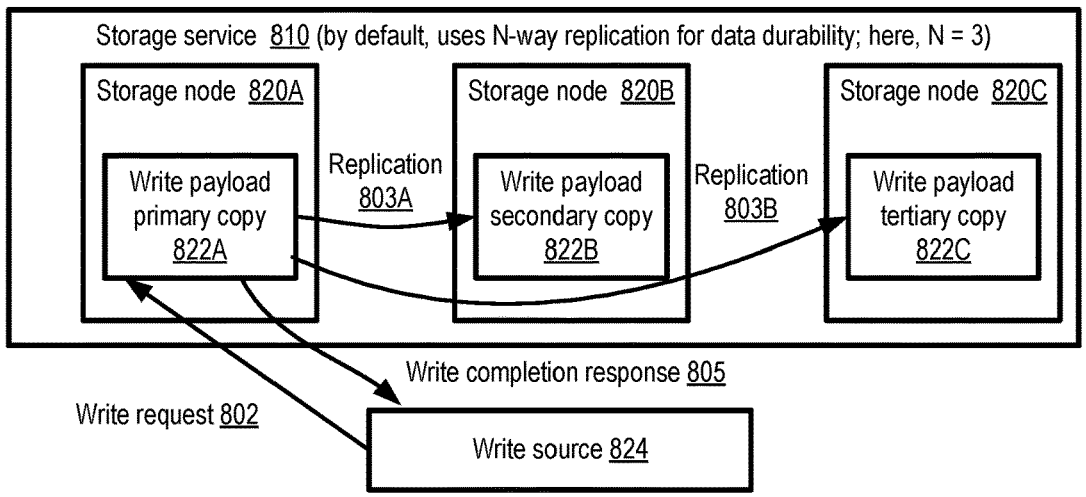
FIG. 8 illustrates an example scenario in which storage-related optimizations may be implemented at multiple levels to support launch acceleration, according to at least some embodiments.
Figure 8:
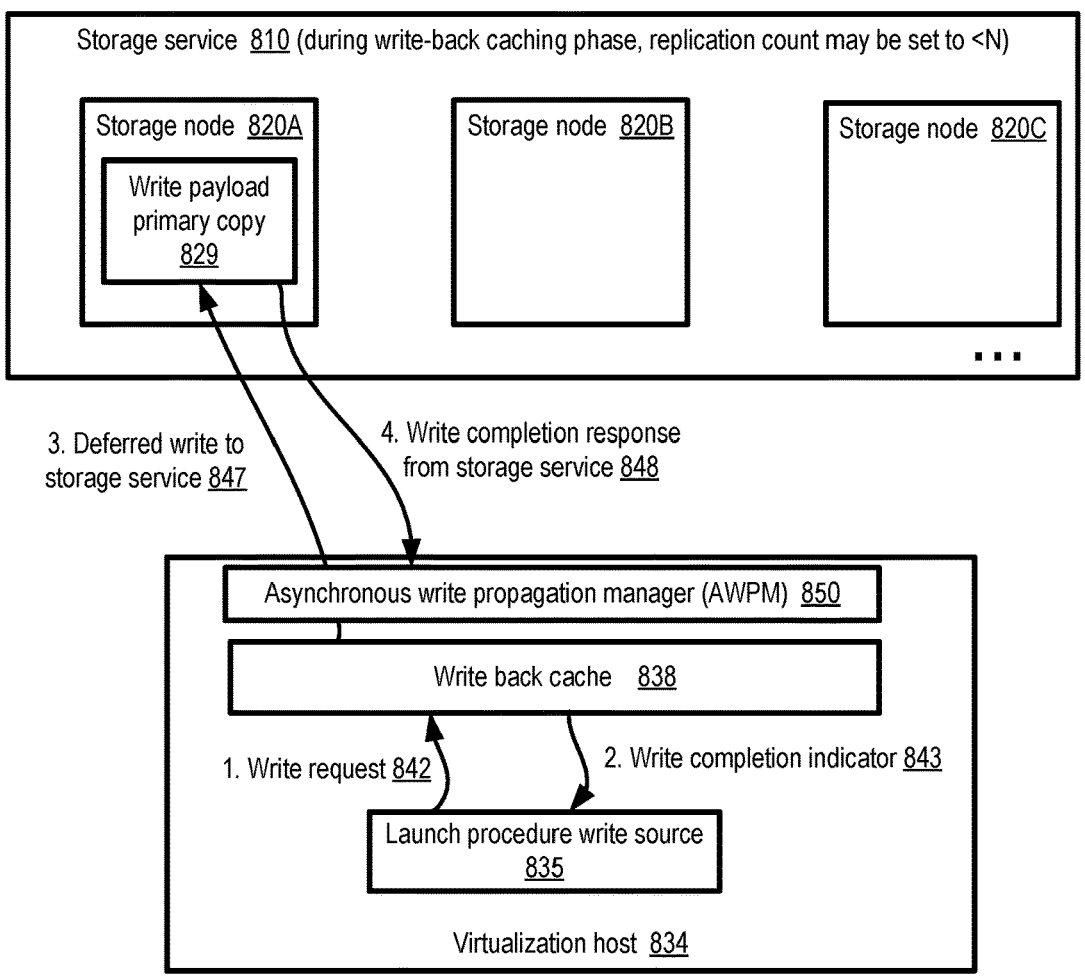

FIG. 8 illustrates an example scenario in which storage-related optimizations may be implemented at multiple levels to support launch acceleration, according to at least some embodiments. In the depicted embodiment, a network-accessible storage service 810 may be used for storing the operating system files and application-related data of compute instances, with the data being transmitted over a network from the corresponding virtualization host. Under normal or default operating conditions, as indicated in the "default behavior" portion 887 of FIG. 8, a plurality of copies or replicas of a given write payload may be stored at respective storage nodes 820 of the storage service before a write is considered complete and a completion response of the write is provided to the write source 824. For example, in response to a write request 802, a primary copy of the write payload 822A may be stored at storage node 820A, a secondary copy 822B may be stored at storage node 820B as a result of replication operation 803A, and a tertiary copy 822C may be stored at storage node 820C as a result of replication 803B; the write completion response 805 may only be provided after all three copies have been successfully created.

In the launch acceleration behavior portion 888 of FIG. 8, an alternative approach to writes which may be implemented during part or all of a launch procedure of a compute instance is shown. When a write request 842 is directed to the storage service from a launch procedure write source 835, the payload of the write request may be stored in a write back cache 838, and a write completion indicator 843 may be provided to the source 835 as soon as the payload has been stored in the cache 838 as discussed earlier. Asynchronously with respect to the write to the cache, an AWPM 850 may transmit the contents of the write payload to the storage service 810, e.g., as part of a deferred write 847 transmitted over a network connection or pathway. The deferred write 847 may comprise coalesced payloads of several different writes to the cache 838 in some embodiments, as discussed earlier in the context of FIG. 3. In the embodiment depicted in FIG. 8, even the deferred write may be treated differently than writes during the default mode of operation at the storage service—e.g., only a single (primary) copy 829 of the write payload may have to be stored before a write completion response 848 is provided from the storage service to the AWPM 850. The replication count setting of the storage service may be reduced temporarily with respect to writes requested during at least some portions of instance launch procedures in the depicted embodiment: that is, at a storage service 810 at which N copies of written data are stored by default, fewer than N copies may be stored during launch procedures (e.g., during at least the write-back caching phases of the launch procedures). As a result, the operations performed by the AWPM 850 may also be accelerated in the depicted embodiment during instance launch procedures. By reducing the time it takes for write responses to be received at the AWPM 850, this technique may help the overall launch procedure to be completed even faster than if only write-back caching was used in various embodiments, as all the writes requested during the launch procedure may eventually have to be written to the storage service by the AWPM before the launch is considered complete. In some embodiments, reduced-replication-count techniques such as those shown in FIG. 8 may not be used: that is, the storage service may only provide write completion responses to the AWPM after the number of replicas indicated by the default replication count setting have been created.

Example Provider Network Environment

Figure 9:
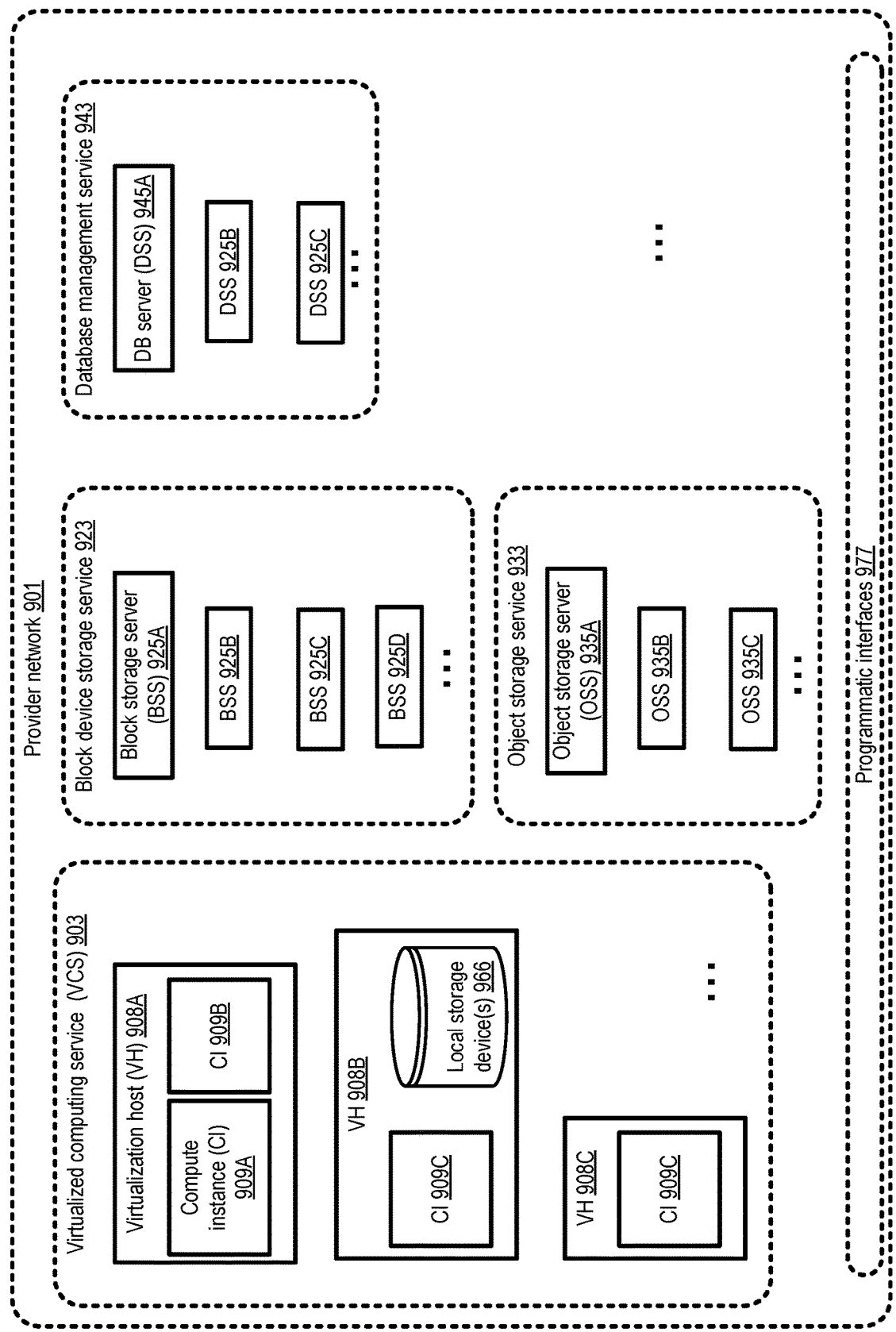
FIG. 9 illustrates an example provider network environment in which several network-accessible services may be used in combination to launch compute instances, according to at least some embodiments.

FIG. 9 illustrates an example provider network environment in which several network-accessible services may be used in combination to launch compute instances, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtualized computing service 903, a block device storage service 923, an object storage service 933, and a database management service 943. The block device storage service 923 may be used to set up highly available and reliable storage volumes that can be attached programmatically to compute instances 909, for example, and such storage volumes may persist independently of the lifetime of the compute instances. Object storage service 933 may provide support for arbitrarily large storage objects, with web-services interfaces being implemented for access to such objects in some embodiments. Each of the services shown in FIG. 9 may include a respective set of computing devices and/or other resources such as storage devices in some embodiments.

Components of a given service may utilize components of other services in the depicted embodiment—e.g., as indicated above, compute instances (CIs) 909A, 909B or 909C, implemented at virtualization hosts 908A, 908B or 908C of the virtualized computing service 903 may utilize one or more block storage servers (BSSs) 925 of block device storage service 923, and/or one or more object storage servers (OSSs) 935, such as 935A-935D, to store contents or more volumes, file systems or other data objects. Individual ones of the services shown in FIG. 9 may implement a respective set of programmatic interfaces 977 which can be used by external and/or internal clients (where the internal clients may comprise components of other services) in the depicted embodiment. Similarly, database servers (DSSs)

945 of service 943, such as 945A-945C, may in some cases be implemented using compute instances 909 and/or storage servers 925 or 935.

According to at least some embodiments, a client of the VCS 903 may be provided options regarding the types of storage to be used for the client's CIs 909. Some clients may, for example, decide to use block device storage service 923 for volumes or file systems of the compute instances; other clients may decide to use object storage service 933, while yet other clients may decide to use only local storage devices 966 available at virtualization hosts. The launch acceleration-related techniques described earlier may be most beneficial in scenarios in which clients decide to use remote storage devices (e.g., at block device storage service 923 or object storage service 933) for at least a subset of the storage needs of their compute instances. Write-back caches may be set up temporarily for launch procedures of such instances that rely on remote storage, for example, and replication count parameters of the remote storage may be modified temporarily to help further speed up the launches.

Methods for Accelerating Compute Instance Launch Times

Figure 10:
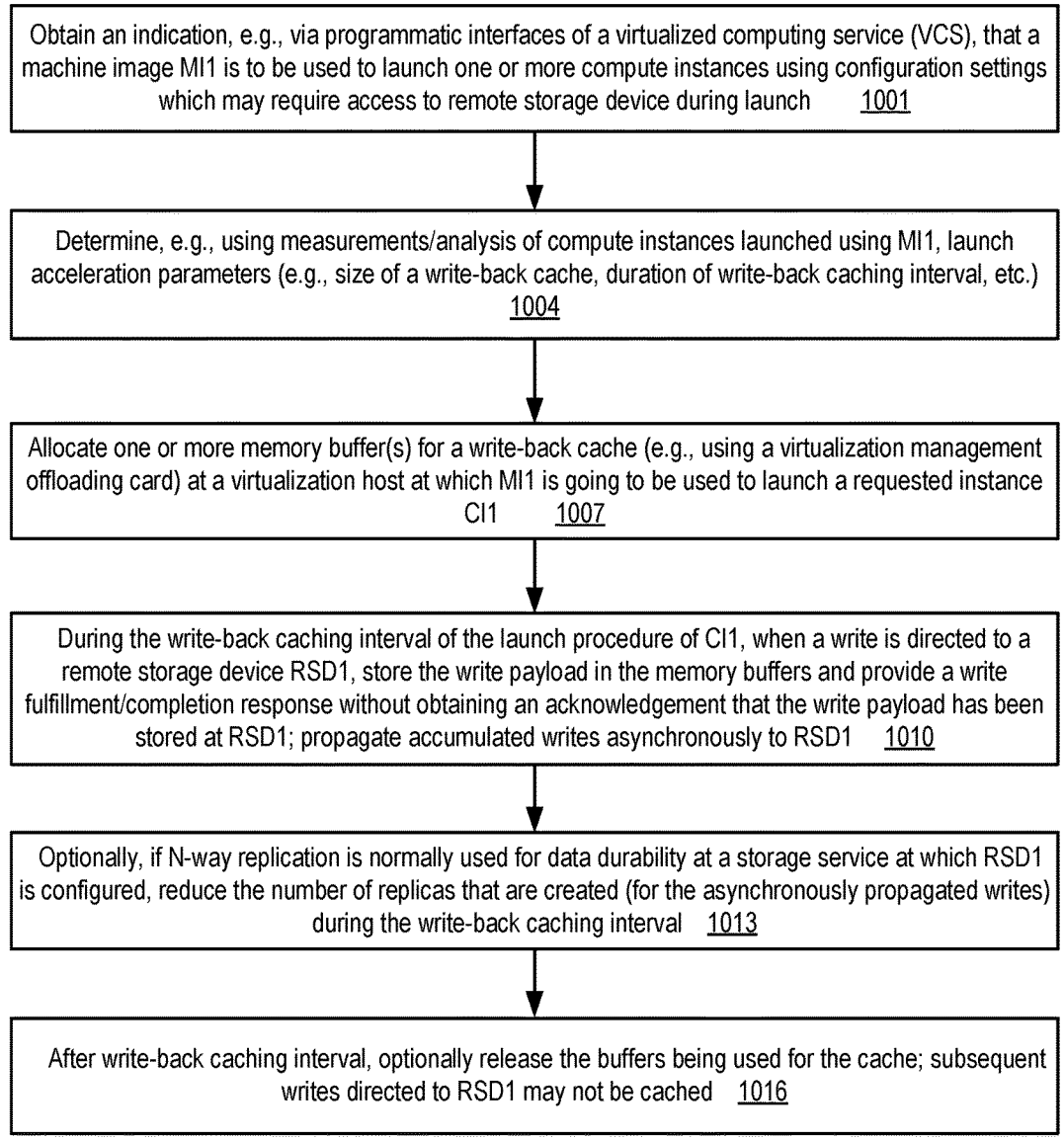
FIG. 10 is a flow diagram illustrating aspects of operations that may be performed to support parameterized launch acceleration for compute instances, according to at least some embodiments.

FIG. 10 is a flow diagram illustrating aspects of operations that may be performed to support parameterized launch acceleration for compute instances, according to at least some embodiments. As shown in element 1001, an indication may be obtained, e.g., via one or more programmatic interfaces of a virtualized computing service (VCS) similar in features and functionality to VCS 110 of FIG. 1, that a machine image MI1 is going to be used to launch one or more compute instances using configuration settings which may require access to remote storage device(s) during at least some of the launches. In at least some embodiments, such an indication may be implicit, in that a client may submit a request to generate MI1 from a snapshot of an existing compute instance, and the request to generate MI1 may be interpreted as a signal that MI1 is likely to be used to launch one or more compute instances later. In other embodiments, a client may submit a programmatic request that explicitly indicates that a particular machine image such as MI1 is going to be used for at least some launches.

According to the depicted embodiment, MI1 may be analyzed to determine values of one or more launch acceleration parameters (element 1004), such as a write-back cache size, a write-back caching interval, and/or other parameters similar to those discussed earlier in the context of FIG. 4. The analysis may, for example, comprise using MI1 to launch one or more compute instances at one or more types of virtualization hosts, and obtaining measurements pertaining to I/O operations, such as the number of writes that are directed to remote storage during various phases of the launch procedure, the sizes of the writes, the time taken to complete individual ones of such writes, the temporal distribution of the writes during the launch procedure, and so on.

On or more memory buffers may be allocated to a write-back cache at a virtualization host at which M1 is going to be used to launch a compute instance CI1 (element 1007) in various embodiments. In some embodiments, a launch request for CI1, submitted by a client via a programmatic interface, may include a parameter indicating that write-back caching is to be used, and the buffers may be allocated in response to receiving such a request. The amount of memory that is allocated may be based on the write-back cache size parameter determined earlier in at least some embodiments. In some embodiments, the virtualization host may comprise a virtualization offloading card (e.g., similar to VMOC 710 shown in FIG. 7), and the buffers may be allocated using memory of such an offloading card. Other devices such as intermediary cards of local disk I/O subsystems, or memory located at off-host devices to which network latencies are shorter than the latencies associated with the targeted remote storage devices, may be used for the write-back cache in some embodiments. Note that in some embodiments, write-back caches may not necessarily be set up for all launches of compute instances—e.g., write-back caching may only be used for "first-time" launches of a given image at a given virtualization host, and may not be utilized for subsequent launches using the same image at the same host.

During the write-back caching interval of the launch procedure of CI1, when a write is directed to a remote storage device RSD1, the write's payload may be stored in the allocated buffer(s) of the write-back cache in the depicted embodiment (element 1010), and a write completion/fulfillment response may be provided without obtaining an acknowledgement that the write payload has been stored at RSD1. The write payloads accumulated at the write-back cache may be propagated asynchronously to RSD1 in at least some embodiments. As mentioned earlier, in some embodiments a cache flush rate limit may be enforced with respect to such propagations, e.g., to ensure that the resource consumption for such asynchronous write propagations does not interfere excessively with other launch operations.

In some embodiments, the remote storage device RSD1 may be configured within a network-accessible storage service at which my default, N-way replication of written blocks or objects is used for data durability. Optionally, in some embodiments, the number or count of replicas that has to be stored at the service may be reduced for the asynchronously propagated writes (element 1013), e.g., during at least a portion of the launch procedure such as the write-back caching interval.

After the write-back caching interval, in some embodiments the memory that was allocated for the write-back cache may be released (element 1016). In other embodiments, the memory may not necessarily be freed. Subsequent writes directed to remote storage devices such as RSD1 during the launch procedure (if any) and/or after the launch procedure completes may not be cached in the depicted embodiment.

It is noted that in various embodiments, some of the operations shown in FIG. FIG. 10 may be implemented in a different order than that shown in the figure, or may be performed in parallel rather than sequentially. Additionally, some of the operations shown in FIG. 10 may not be required in one or more implementations.

Use Cases

The techniques described above, of temporarily configuring write-back caches for accelerating the launches of compute instances at virtualization hosts, may be useful in a variety of scenarios. Many modern large-scale applications are run using compute instances at virtualized computing services, often using machine images that have been custom-generated by or for the clients of the services. Often, for a number of reasons including data durability and availability, some or all of the storage volumes or file systems of the compute instances may be configured at remote storage devices—that is, reads and writes directed to such volumes or file systems may have to be performed via a network. For some machine images, the launch procedure of a compute instance may include several queue-depth-one write operations to remote storage—that is, additional operations of the launch procedure after a given write may have to wait until the write completes. The use of the described write-back caching technique may alleviate the delays associated with such writes, and lower the overall launch time substantially. Because at least some virtualization hosts may already have memory (e.g., at virtualization management offloading cards) available that can be temporarily assigned to such caches, no additional hardware costs may be incurred for the caches. The achieved reductions in launch times may in turn lead to increased customer satisfaction, because clients do not have to wait as long for their requested instances to become usable for their applications.

Illustrative Computer System

Figure 11:
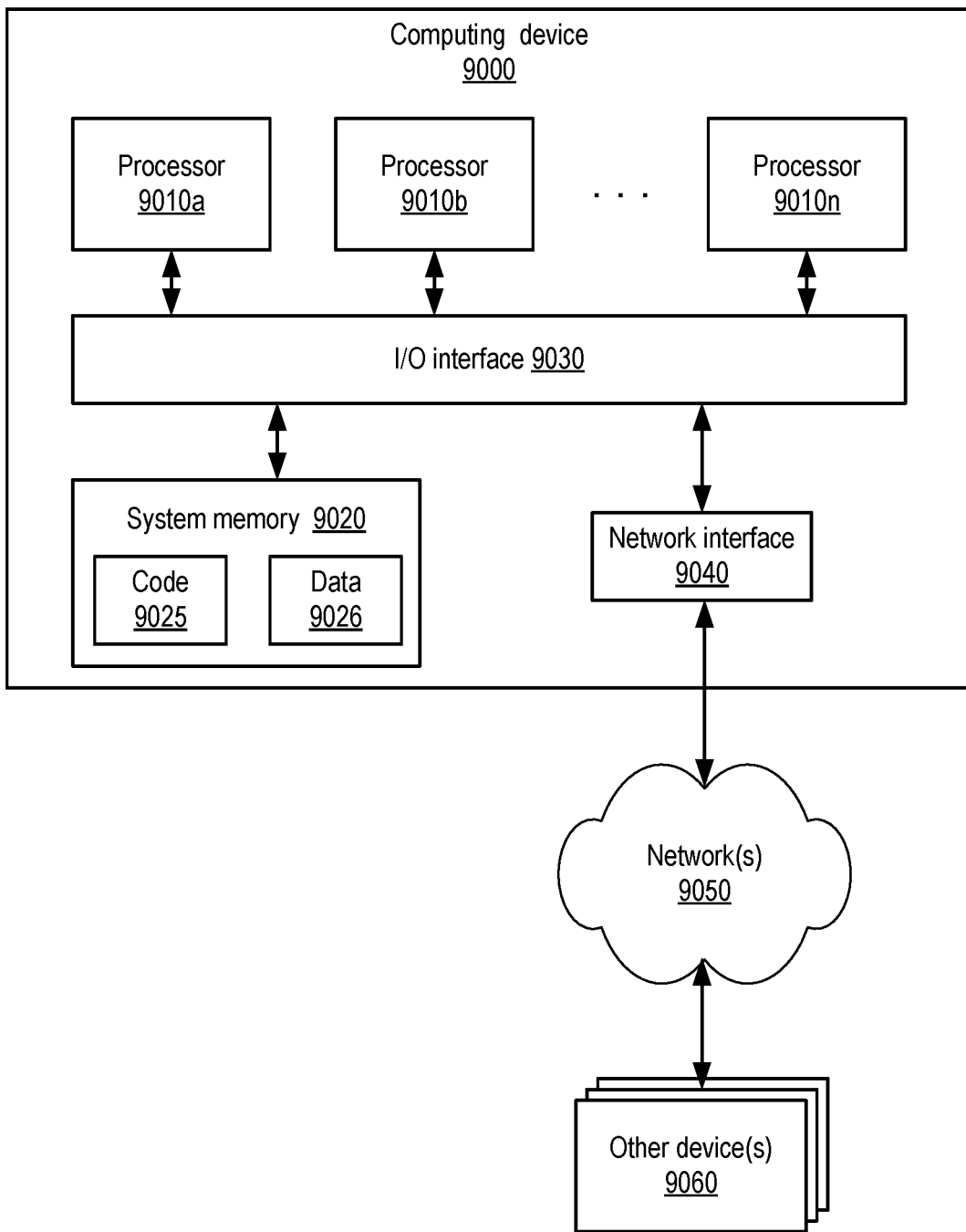
FIG. 11 is a block diagram illustrating an example computing device that may be used in at least some embodiments.

In at least some embodiments, a server that implements a portion or all of one or more of the technologies described herein, including the techniques for various elements of a virtualized computing service (including virtualization hosts and control plane servers), as well as resources of one or more storage services, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors and memory including instructions that upon execution on or across the one or more processors cause the one or more processors to:
obtain an indication of a machine image, wherein in accordance with a configuration setting, a remote storage device is to be accessed from a virtualization host over a network during a launch procedure of at least some compute instances launched using the machine image;
determine, based at least in part on analysis of the machine image, one or more launch acceleration parameters for the machine image, including (a) a write-back cache size and (b) a caching interval;
allocate one or more memory buffers for a local write-back cache of a virtualization host at which the machine image is to be used to launch a compute instance, wherein the one or more memory buffers are incorporated within a virtualization offloading card linked to a primary processor of the virtualization host via a peripheral interconnect, and wherein the amount of memory allocated for the one or more memory buffers is based at least in part on the write-back cache size;
in response to a particular write request directed to a remote storage device from the virtualization host prior to an expiration of the caching interval, (a) store a payload of the particular write request in a buffer of the one or more memory buffers, and (b) provide an indication of completion of the particular write request without obtaining an acknowledgement that the payload has also been stored at the remote storage device; and
subsequent to a determination that the caching interval has expired, (a) release the one or more memory buffers and (b) cause a payload of another write request directed to the remote storage device during the launch procedure to be transmitted to the remote storage device without caching the payload of the other write request.

2. The system as recited in claim 1, wherein the instructions upon execution on or across the one or more processors further cause the one or more processors to:
obtain a request, via one or more programmatic interfaces, to accelerate the launch procedure, wherein the one or more memory buffers are allocated in response to the request.

3. The system as recited in claim 1, wherein the analysis of the machine image comprises measurements of one or more input/output operations during a launch of another compute instance using the machine image.

4. The system as recited in claim 1, wherein during the analysis of the machine image, the caching interval is determined based at least in part on a detection of a restart of the compute instance.

5. The system as recited in claim 1, wherein the instructions upon execution on or across the one or more processors further cause the one or more processors to:
determine whether the machine image has previously been used to launch one or more other compute instances at the virtualization host, wherein the one or more memory buffers are allocated for the local write-back cache in response to a determination that the machine image has not been used previously to launch one or more compute instances at the virtualization host.

6. A method, comprising: performing, at one or more computing devices: allocating one or more memory buffers to a write-back cache at a virtualization host, wherein the amount of memory allocated for the one or more memory buffers is based at least in part on a cache size parameter associated with a launch procedure of a compute instance of the virtualization host; in response to a particular write request directed to a remote storage device during the launch procedure, (a) storing a payload of the particular write request in a buffer of the one or more buffers, and (b) providing an indication of fulfillment of the particular write request without obtaining an acknowledgement that the payload has been propagated to the remote storage device; and subsequent to determining that a criterion for terminating write-back caching of the launch procedure has been met, causing a payload of another write request directed to the remote storage device to be to the remote storage device without storing the payload of the other write request at the one or more memory buffers.

7. The method as recited in claim 6, further comprising performing, at the one or more computing devices: obtaining a request, via one or more programmatic interfaces, to accelerate the launch procedure, wherein the one or more memory buffers are allocated in response to the request.

8. The method as recited in claim 6, further comprising performing, at the one or more computing devices: obtaining one or more performance measurements associated with a launch of another compute instance; and utilizing the set of performance measurements to determine the amount of memory to be allocated for the one or more memory buffers.

9. The method as recited in claim 6, further comprising performing, at the one or more computing devices: identifying, based at least in part on analysis of a launch of another compute instance, the criterion for terminating write-back caching.

10. The method as recited in claim 9, wherein identifying the criterion for terminating write-back caching comprises one or more of: (a) selecting a time interval after which write-back caching is to be terminated, or (b) identifying an event, such that a detection of an occurrence of the event during the launch procedure is to be used as an indicator that write-back caching is to be terminated.

11. The method as recited in claim 6, wherein the compute instance is launched using a first virtual machine image, the method further comprising performing, at the one or more computing devices: storing, corresponding to the first virtual machine image, a first set of launch acceleration parameters, including the amount of memory to be allocated for the one or more buffers; and storing, corresponding to a second virtual machine image, a second set of launch acceleration parameters, including a different amount of memory to be allocated for one or more buffers of a write-back cache to be configured for a compute instance to be launched via the second virtual machine image.

12. The method as recited in claim 6, further comprising performing, at the one or more computing devices: increasing, prior to terminating the write-back caching during the launch procedure, a rate at which write payloads stored in the write-back cache are propagated to the remote storage device.

13. The method as recited in claim 6, wherein the one or more memory buffers are incorporated within a card attached to a primary processor of the virtualization host via a peripheral interface.

14. The method as recited in claim 13, wherein the card comprises one or more systems-on-chip (SOCs) configured to perform offloading of a virtualization management operation from the primary processor.

15. The method as recited in claim 6, further comprising performing, at the one or more computing devices: configuring a root file system of the compute instance at the first remote storage device, wherein configuring the root file system comprises the particular write.

16. One or more non-transitory computer-accessible storage media storing program instructions that when executed on or across one or more processors cause one or more computer systems to: receive a request to initiate a launch procedure to configure a compute instance at a virtualization host, wherein the compute instance is configured to access a remote storage device over a network; allocate a memory buffer of the virtualization host as a write-back cache for use during at least a portion of the launch procedure; in response to a particular write request directed to the remote storage device during the portion of the launch procedure, (a) store a payload of the particular write request in the memory buffer, and (b) provide an indication of fulfillment of the particular write request independently of obtaining an acknowledgement that the payload has been propagated to the remote storage device; and subsequent to the portion of the launch procedure, cause a payload of another write request directed to the remote storage device to be transmitted to the remote storage device.

17. The one or more non-transitory computer-accessible storage media as recited in claim 16, wherein the remote storage device is configured within a network-accessible storage service, wherein the one or more non-transitory computer-accessible storage media store further program instructions that when executed on or across the one or more processors further cause one or more computer systems to: transmit, to the network-accessible storage service, from an asynchronous write propagation manager of the write-back cache, a request to store the payload of the particular write; and obtain, at the asynchronous write propagation manager, an indication that the payload of the particular write has been stored at the network-accessible storage service in accordance with a replication count setting of the network-accessible storage service.

18. The one or more non-transitory computer-accessible storage media as recited in claim 16, storing further program instructions that when executed on or across the one or more processors further cause one or more computer systems to: cause a reduction of the replication count setting during at least a portion of the launch procedure.

19. The one or more non-transitory computer-accessible storage media as recited in claim 16, storing further program instructions that when executed on or across the one or more processors further cause one or more computer systems to: in response to the determination that a criterion for terminating write-back caching of the launch procedure has been met, release the memory buffer.

20. The one or more non-transitory computer-accessible storage media as recited in claim 16, storing further program instructions that when executed on or across the one or more processors further cause one or more computer systems to: determine a cache flush rate limit parameter associated with the launch procedure; and in accordance with the cache flush rate limit parameter, one or more write payloads stored in the memory buffer to the remote storage device.

21. The one or more non-transitory computer-accessible storage media as recited in claim 16, wherein the indication of fulfillment of the particular write request is provided to a software process or thread implementing at least the portion of the launch procedure.

\* \* \* \* \*